US00RE39645E

(19) United States
(12) Reissued Patent
Yoshida

(10) Patent Number: US RE39,645 E
(45) Date of Reissued Patent: May 22, 2007

(54) COMPRESSED IMAGE DECOMPRESSING DEVICE

(75) Inventor: Toyohiko Yoshida, Tokyo (JP)

(73) Assignee: Renesas Technology Corp., Tokyo (JP)

(21) Appl. No.: 10/029,385

(22) Filed: Dec. 28, 2001

Related U.S. Patent Documents

Reissue of:
(64) Patent No.: 6,009,205
Issued: Dec. 28, 1999
Appl. No.: 08/611,051
Filed: Mar. 5, 1996

(30) Foreign Application Priority Data

Sep. 8, 1995 (JP) ..... 7-231674

(51) Int. Cl.
*G06K 9/36* (2006.01)

(52) U.S. Cl. ..... 382/246; 358/426.13

(58) Field of Classification Search ..... 382/100, 382/232–235, 238, 244–248, 138–139, 250; 341/65–67, 55, 51; 358/426.13, 539; 375/240.23; 708/402; 709/247

See application file for complete search history.

(56) References Cited

U.S. PATENT DOCUMENTS 4,939,583 A * 7/1990 Tsuboi et al. ..... 358/261.1
5,155,852 A * 10/1992 Murakami et al. ..... 709/100
5,239,654 A 8/1993 Ing-Simmons et al. ..... 395/800
5,440,345 A * 8/1995 Shimoda ..... 375/240.14
5,448,655 A * 9/1995 Yamaguchi ..... 382/304
5,486,876 A * 1/1996 Lew et al. ..... 348/719
5,502,493 A * 3/1996 Meyer ..... 375/240.26
5,568,278 A * 10/1996 Nakano et al. ..... 358/427
5,598,514 A * 1/1997 Purcell et al. ..... 395/118
5,657,416 A * 8/1997 Boon ..... 382/246
5,675,424 A * 10/1997 Park ..... 382/234
5,699,460 A * 12/1997 Kopet et al. ..... 382/307

FOREIGN PATENT DOCUMENTS

EP 0572263 A 12/1993

OTHER PUBLICATIONS

"Programmable Vision Processor/Controller for Flexible Implementation of Current and Future Image Compression Standards", Bailey, Doug et al., IEEE Micro, vol. 12, No. 5, Oct. 1, 1992, pp. 33–39.
"Single Chip Performs Both Audio and video Decoding" by Dave Bursky, *Electronic Design* Apr. 3, 1995.
"Accelerating Multimedia with Enhanced Microprocessors" by Ruby B. Lee, *IEEE* 1995.
"Practical Fast 1–D DCT Algorithms with 11 Multiplications" by Christoph Loeffler et al., pp. 988–991.

* cited by examiner

*Primary Examiner*—Jayanti K. Patel
(74) *Attorney, Agent, or Firm*—McDermott, Will & Emery

(57) ABSTRACT

An image processing device which processes a portion of the decompression process including a lot of comparatively complex operations like an inverse discrete cosine transform by software with using a high-performance, general-purpose processor capable of parallel processing, and the other portion of the decompression process which is comparatively simple but requires frequent access to a memory, e.g., when other frame data is to be read out for processing of encoded interframe predictive image data, or is comparatively simple but substantially hard to process in parallel, e.g., when variable length coded pixel values are to be decoded, by hardware with the use of a specialized peripheral circuit.

23 Claims, 22 Drawing Sheets

FIG. 3

| code: | format | orders to be issued container_0 | container_1 |
|---|---|---|---|
| FM=00 | :2-ops. | 1st | 2nd |
| 01 | :2-ops. | 1st | 1st |
| 11 | :2-ops. | 2nd | 1st |
| 10 | :1-op. | 1st | ... |

FIG. 4

| Code | Conditions to be executed |
|---|---|
| CC=000 | Always |
| 001 | F0=10 and F1=don't care |
| 010 | F0=10 and F1=10 |
| 011 | F0=10 and F1=11 |
| 100 | Reserved |
| 101 | F0=11 and F1=don't care |
| 110 | F0=11 and F1=10 |
| 111 | F0=11 and F1=11 |

FIG. 7

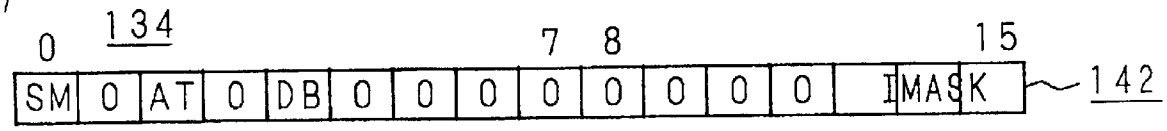

SM=0 Stack mode 0, SPI is used.
SM=1 Stack mode 1, SPU is used.

AT=0 Without address translation
AT=1 With address translation

DB=0 Context is not being debugged
DB=1 Context is being debugged

IMASK=000 Unmaskable interrupt(priority 0)only accepted
IMASK=001 Interrupts between priority 1and 6 are masked
IMASK=010 Interrupts between priority 2and 6 are masked
⋮ ⋮ ⋮ ⋮
IMASK=110 Interrupt of priority 6 is masked
IMASK=111 Not masked

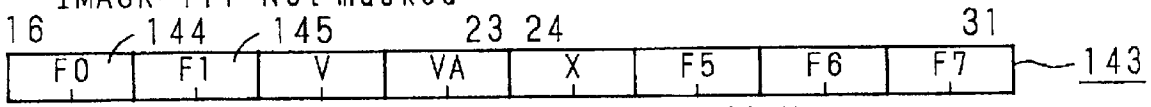

F0 :Execution control flag #0
F1 :Execution control flag #1
V(F2) :Overflow flag
VA(F3):Accumulated overflow flag
X(F4) :Extension flag
F5 :General flag
F6 :General flag
F7 :General flag 00:Undefined
01:Reserved
10:False
11:True

FIG. 11A

8x8 ORIGINAL IMAGE DATA

| | | | | | | | |
|---|---|---|---|---|---|---|---|
| $a_1$ | $a_2$ | $a_3$ | $a_4$ | $a_5$ | $a_6$ | $a_7$ | $a_8$ |
| $a_9$ | $a_{10}$ | $a_{11}$ | $a_{12}$ | $a_{13}$ | $a_{14}$ | $a_{15}$ | $a_{16}$ |
| $a_{17}$ | $a_{18}$ | $a_{19}$ | $a_{20}$ | $a_{21}$ | $a_{22}$ | $a_{23}$ | $a_{24}$ |
| $a_{25}$ | $a_{26}$ | $a_{27}$ | $a_{28}$ | $a_{29}$ | $a_{30}$ | $a_{31}$ | $a_{32}$ |
| $a_{33}$ | $a_{34}$ | $a_{35}$ | $a_{36}$ | $a_{37}$ | $a_{38}$ | $a_{39}$ | $a_{40}$ |
| $a_{41}$ | $a_{42}$ | $a_{43}$ | $a_{44}$ | $a_{45}$ | $a_{46}$ | $a_{47}$ | $a_{48}$ |
| $a_{49}$ | $a_{50}$ | $a_{51}$ | $a_{52}$ | $a_{53}$ | $a_{54}$ | $a_{55}$ | $a_{56}$ |
| $a_{57}$ | $a_{58}$ | $a_{59}$ | $a_{60}$ | $a_{61}$ | $a_{62}$ | $a_{63}$ | $a_{64}$ |

DCT

FIG. 11B

TRANSFORMED IMAGE DATA

| | | | | | | | |
|---|---|---|---|---|---|---|---|
| $b_1$ | $-b_2$ | $b_6$ | $-b_7$ | $b_{15}$ | $-b_{16}$ | $b_{28}$ | $-b_{29}$ |
| $b_3$ | $b_5$ | $b_8$ | $b_{14}$ | $b_{17}$ | $b_{27}$ | $b_{30}$ | $b_{43}$ |
| $b_4$ | $b_9$ | $b_{13}$ | $b_{18}$ | $b_{26}$ | $b_{31}$ | $b_{42}$ | $b_{44}$ |
| $b_{10}$ | $b_{12}$ | $b_{19}$ | $b_{25}$ | $b_{32}$ | $b_{41}$ | $b_{45}$ | $b_{54}$ |
| $b_{11}$ | $b_{20}$ | $b_{24}$ | $b_{33}$ | $b_{40}$ | $b_{46}$ | $b_{53}$ | $b_{55}$ |
| $b_{21}$ | $b_{23}$ | $b_{34}$ | $b_{39}$ | $b_{47}$ | $b_{52}$ | $b_{56}$ | $b_{61}$ |
| $b_{22}$ | $b_{35}$ | $b_{38}$ | $b_{48}$ | $b_{51}$ | $b_{57}$ | $b_{60}$ | $b_{62}$ |
| $b_{36}$ | $-b_{37}$ | $b_{48}$ | $-b_{50}$ | $b_{58}$ | $-b_{59}$ | $b_{63}$ | $-b_{64}$ |

QUANTIZATION

FIG. 11C

QUANTIZED IMAGE DATA

| | | | | | | | |
|---|---|---|---|---|---|---|---|
| $c_1$ | $-c_2$ | 0 | 0 | 0 | 0 | 0 | 0 |
| $c_3$ | $c_5$ | 0 | 0 | 0 | 0 | 0 | 0 |
| $c_4$ | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 12A

INVERSE QUANTIZED IMAGE DATA

| | | | | | | | |
|---|---|---|---|---|---|---|---|
| $b'_1$ | $b'_2$ | 0 | 0 | 0 | 0 | 0 | 0 |
| $b'_3$ | $b'_5$ | 0 | 0 | 0 | 0 | 0 | 0 |
| $b'_4$ | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

IDCT

FIG. 12B

8×8 REPRODUCED IMAGE DATA

| | | | | | | | |
|---|---|---|---|---|---|---|---|
| $a'_1$ | $a'_2$ | $a'_3$ | $a'_4$ | $a'_5$ | $a'_6$ | $a'_7$ | $a'_8$ |
| $a'_9$ | $a'_{10}$ | $a'_{11}$ | $a'_{12}$ | $a'_{13}$ | $a'_{14}$ | $a'_{15}$ | $a'_{16}$ |
| $a'_{17}$ | $a'_{18}$ | $a'_{19}$ | $a'_{20}$ | $a'_{21}$ | $a'_{22}$ | $a'_{23}$ | $a'_{24}$ |
| $a'_{25}$ | $a'_{26}$ | $a'_{27}$ | $a'_{28}$ | $a'_{29}$ | $a'_{30}$ | $a'_{31}$ | $a'_{32}$ |
| $a'_{33}$ | $a'_{34}$ | $a'_{35}$ | $a'_{36}$ | $a'_{37}$ | $a'_{38}$ | $a'_{39}$ | $a'_{40}$ |
| $a'_{41}$ | $a'_{42}$ | $a'_{43}$ | $a'_{44}$ | $a'_{45}$ | $a'_{46}$ | $a'_{47}$ | $a'_{48}$ |
| $a'_{49}$ | $a'_{50}$ | $a'_{51}$ | $a'_{52}$ | $a'_{53}$ | $a'_{54}$ | $a'_{55}$ | $a'_{56}$ |
| $a'_{57}$ | $a'_{58}$ | $a'_{59}$ | $a'_{60}$ | $a'_{61}$ | $a'_{62}$ | $a'_{63}$ | $a'_{64}$ |

COMPRESSED IMAGE DECOMPRESSING DEVICE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an image processing device for decompressing compressed image data. In the device, a general-purpose microprocessor and a specialized circuit cooperate to efficiently decompress the compressed image data, more specifically, the general-purpose microprocessor executes a portion of the data decompression process including a lot of arithmetical and logical operations by software, whereas the specialized circuit carries out a portion of the decompression process including a lot of operations to read out data from a memory.

2. Description of the Related Art

Since image data is considerably large in volume, the data is usually encoded to digital data and further compressed when stored or transmitted. Many studies have been already made especially in relation to encoding and compressing of moving picture data, which results in a standard format of image data for the MPEG (Moving Picture Experts Group) or the like set by the International Organization for Standardization.

Decompression of image data is necessary so as to reproduce an original image data from the compressed image data as represented by moving picture data meeting the MPEG standard. For this purpose, various LSIs for decompression of moving picture data, e.g., HDM8211M (Hyundai Electronics America), M65771FP and M65770FP (Mitsubishi Denki Kabushiki Kaisha), etc. have been developed. The HDM8211M, for example, is described in "Single Chip Performs Both Audio and Video Decoding" (Dave Bursky: pp. 77–80; Electronic Design, Apr. 3, 1995).

Those conventional LSIs require an integrated structure of a lot of operation units, which increases a hardware scale and costs. Further, those LSIs are constructed for a specific purpose and unusable for other uses, therefore, making it necessary to develop LSIs of kinds proportional to the kinds of image data. Thus, the conventional LSIs lack flexibility.

To solve the above-mentioned problem, decompression of image data by software without employing specialized hardware has been tried, whereby some instructions exclusive for processing the MPEG image data are added to a general-purpose microprocessor. The idea is described in "Accelerating Multimedia with Enhanced Microprocessors" (Ruby B. Lee: pp. 22–32; IEEE Micro, April 1995). The decompression process for the MPEG standard image data by software applies an excessive load on the conventional image processing device in spite of a limited operational efficiency or a limited memory access speed of the general-purpose processor. Therefore, the conventional decompression process by software actually achieves low-quality moving picture data or decompresses image data in non-real time, and it is insufficient for decompressing moving picture data in real time with high quality.

SUMMARY OF THE INVENTION

The present invention was devised to overcome the aforementioned problems. A main object of the invention is to provide an image processing device in which a general-purpose microprocessor for processing an image data by software and a peripheral circuit for processing the image data by hardware cooperatively work thereby to efficiently decompress the image data such as represented by the MPEG-standard image data, and to relatively lower production costs.

The image processing device of the invention executes a portion of the decompression process which includes a lot of complex operations like an inverse discrete cosine transform by software with the use of a high-performance, general-purpose processor capable of parallel processing. In the meantime, the device of the invention executes the other portion of the decompression process which is relatively simple, but requires frequent memory access, for example, when other frame data are to be read out to process encoded interframe predictive image data, or is relatively simple but substantially hard to process in parallel, e.g., in case of decoding of variable length coded pixel values, by hardware with the use of a specialized peripheral circuit. Accordingly, the general-purpose processor that processes image data by software and the peripheral circuit that processes image data by hardware work cooperatively.

In the image processing device of the invention, a specialized peripheral circuit such as a VLC (variable length code) decoder and/or a block loader executes a process among necessary processes by hardware which requires a lot of data to be read out from a large-capacity memory but relatively simple, while a microprocessor processes a process by software which includes a lot of complicated operations such as an inverse discrete cosine transform.

In the image processing device of the invention, a specialized hardware and a microprocessor cooperatively process image data like through a pipeline thereby to restrict the total scale of hardware, and to enhance a processing speed even when a large-capacity memory of a relatively low processing speed is used. Hence, the device is inexpensive with a good performance.

Further, in the image processing device of the invention, a microprocessor covers complicated operations by software. The device is applicable not only to the MPEG standard but to other image processing methods. Accordingly, the device can flexibly cope with every method through modification of software.

The above and further objects and features of the invention will more fully be apparent from the following detailed description with accompanying drawings.

BRIEF DESCRIPTION OF THE DRAWINGS

FIG. 3 is a diagram showing detailed contents of a format field of an instruction of the microprocessor in the image processing device of the invention;

FIG. 4 is a diagram showing detailed contents of an execution condition field of the instruction of the microprocessor in the image processing device of the invention;

FIG. 7 is a diagram showing contents of a processor status word of the microprocessor in the image processing device of the invention;

FIGS. 11A–11C are schematic diagrams explanatory of a compression (encoding) process for moving picture data;

FIGS. 12A and 12B are schematic diagrams explanatory of a decompression (decoding) process for compressed (encoded) moving picture data;

DESCRIPTION OF THE PREFERRED EMBODIMENTS

[Embodiment 1]

(1) Entire architecture

Figure 1:
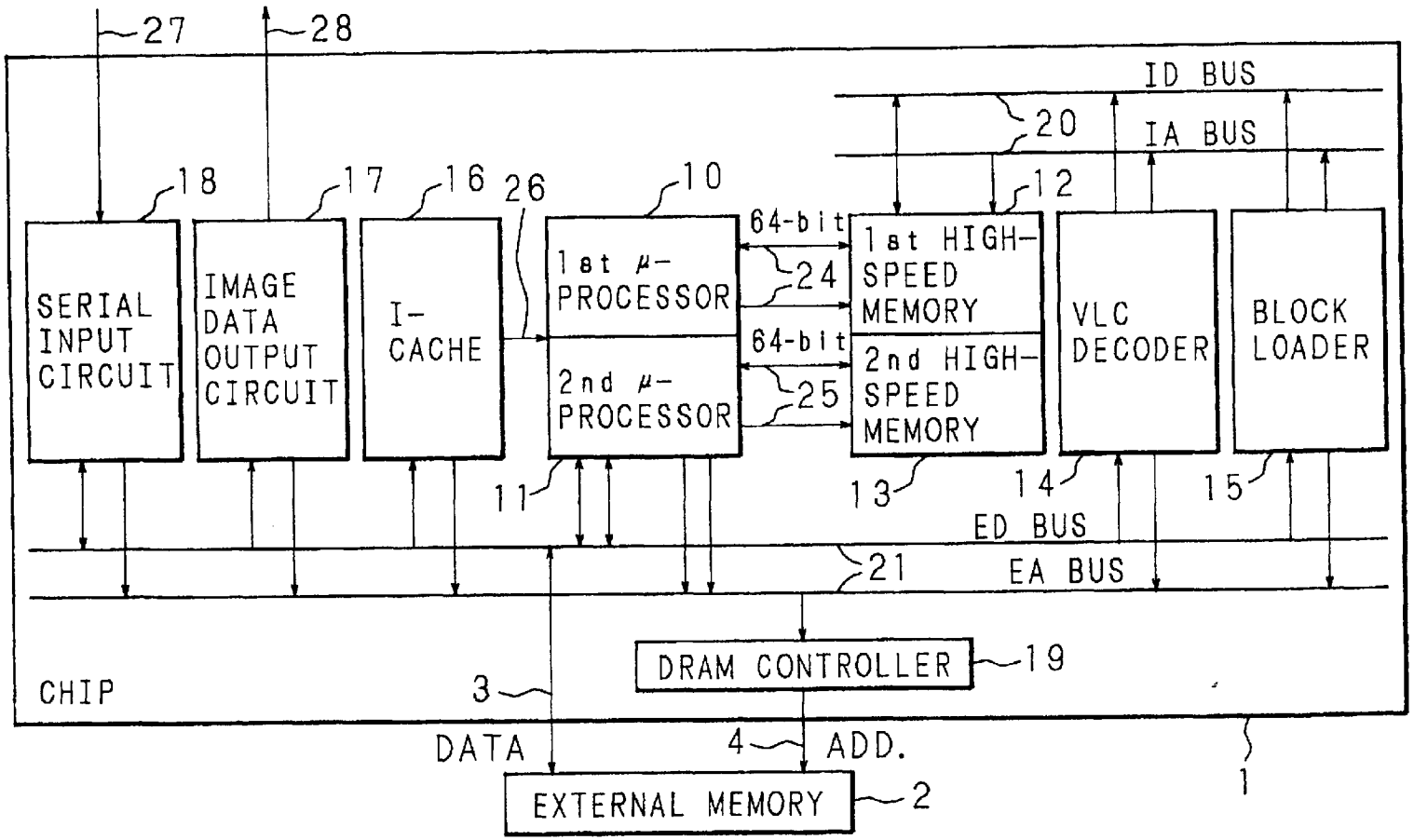
FIG. 1 is a block diagram showing an example of the configuration of a system including a first embodiment of an image processing device of the invention connected to a memory.

FIG. 1 is a block diagram showing an example of the construction of a first embodiment of an image processing device of the invention in a system, to which a memory is connected. In the figure, numeral 1 denotes a chip on which is mounted the image processing device of the invention, which is connected via a data bus 3 and an address bus 4, etc. to an external memory 2 composed of plural DRAM chips.

The image processing device of the invention mainly processes three kinds of data, that is, video data meeting the MPEG standard whereby compressed image data of 30 frames is decompressed per second, each frame being composed of 90×60=5400 blocks and each block being composed of 8×8=64 pixels, audio data attached to the video data, and system data relating to the operation of a decoding system.

An operational unit which plays a central role in the image processing device of the invention includes a first microprocessor 10 and a second microprocessor 11. The first and second microprocessors 10, 11 distribute the load according to a multiprocessing method thereby to process image data with high efficiency.

In the figure, numeral 12 and 13 respectively denote first and second high-speed memories. The first and second high-speed memories 12, 13 which function as local memories for the microprocessors 10, 11 are connected to the first and second microprocessors 10, 11 via buses 24, 25, respectively.

A VLC (variable length code) decoder 14 decodes a variable-length-coded image data of the above-mentioned blocks each composed of 64 pixels into data of fixed length 64 pixels, and outputs the decoded data to the high-speed memories 12, 13 through an internal bus 20.

A block loader 15 reads out the block data of an adjacent frame which is to be added with differential data according to the interframe predictive coding method from the external memory 2 and outputs the read-out data to the high-speed memories 12, 13 through the internal bus 20. The VLC decoder 14 and block loader 15 connected to the high-speed memories 12, 13 via the internal bus 20 arbitrate a bus access right in order to write data in the high-speed memories 12, 13. The internal bus 20 consists of an address bus (IA bus) and a data bus (ID bus).

An instruction cache 16 is used by the first and second microprocessors 10, 11 in common. The instruction cache 16 caches instructions fetched from the external memory 2 via an external bus 21 and supplies the first and second microprocessors 10, 11 with the instructions. The instruction cache 16 can supply the first and second microprocessors 10, 11 with the same instructions, simultaneously, or can supply only either one of the two with the instructions. The external bus 21 connecting the image processing device of the invention and the external memory 2 includes an address bus (EA bus) and a data bus (ED bus).

An image data output circuit 17 reads out the completely decompressed image data from the external memory 2 through the external bus 21, then outputs the data outside through a bus 28. A serial input circuit 18 converts the serial compressed data input through a serial signal line 27 from outside into parallel data, then writes the data to the external memory 2 via the external bus 21. Therefore, the serial signal line 27 is connected to an external antenna or an output line of a digital video disc (DVD) reproducing apparatus, whereas the bus 28 is connected to an image display device such as a CRT display device.

The first and second microprocessors 10, 11, the VLC decoder 14, the block loader 15, the instruction cache 16, the image data output circuit 17 and the serial input circuit 18 access the external memory 2 by arbitrating the access right to the external bus 21.

A DRAM controller 19, provided between the address bus (EA bus) of the external bus 21 and the external memory 2 translates an address output to the external bus 21 into a row address and a column address for accessing the external memory 2.

(2) Microprocessor

The first and second microprocessors 10, 11 have the same construction. In this first embodiment, the image processing program includes a period while only the first microprocessor 10 operates, a period while only the second microprocessor 11 operates, and a period while both microprocessors 10, 11 operate. But instructions, the constitution of registers, and hardware functions of the two microprocessors are essentially the same, and therefore only the first microprocessor 10 will be explained here, which applies also to the second microprocessor 11.

(2.1) Instruction set and register composition

Figure 2:
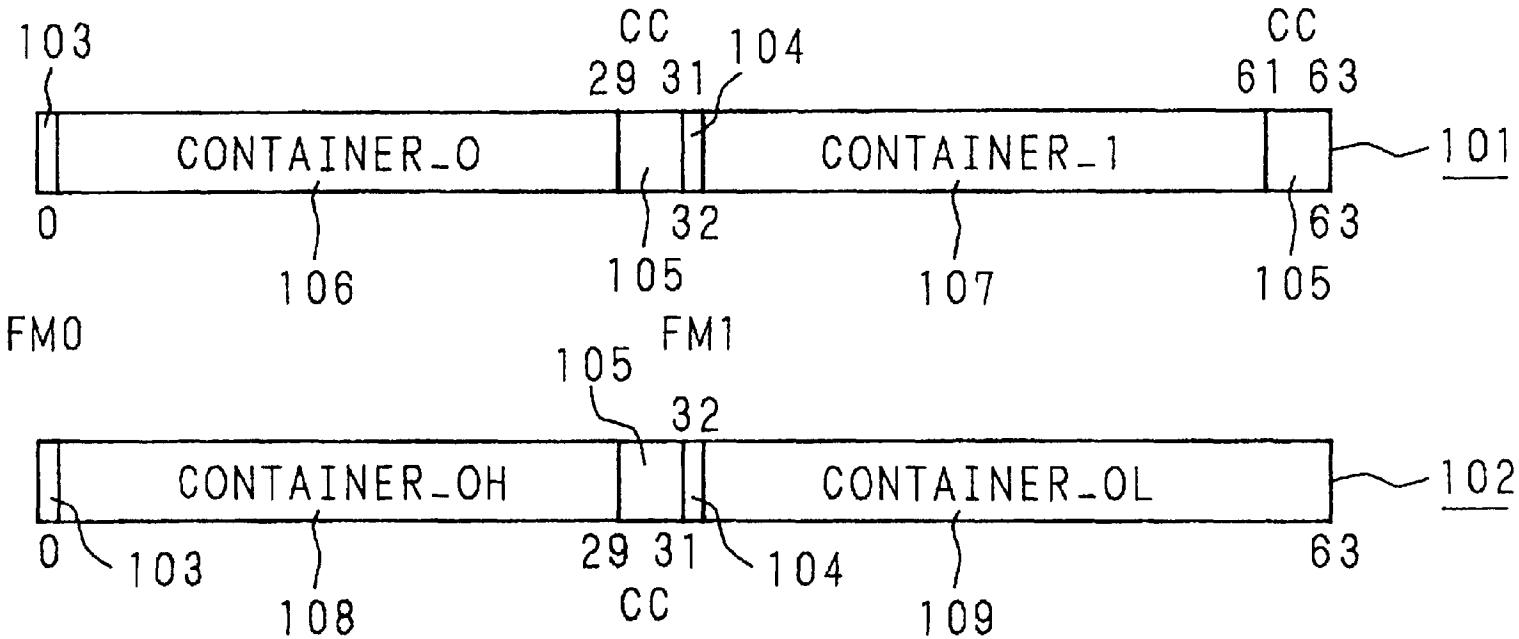
FIG. 2 is a diagram showing an instruction format of a microprocessor in the image processing device of the invention.

Formats of instructions of the microprocessor 10 are shown in FIG. 2, namely, a format 101 of two sub- instructions which instruct two operations by one instruction, and a format 102 of one sub-instruction which indicates one operation by one instruction.

The two-operation format 101 includes a format field composed of two one-bit fields 103 and 104, two container fields 106, 107, and an execution condition field 105 of 3 bits attached to each of the container fields 106 and 107. The one-operation instruction format 102 includes a format field composed of two one-bit fields 103 and 104, a container field composed of two fields 108 and 109, and an execution condition field 105 of 3 bits attached only to the one field 108 of the container field.

FIG. 3 is a diagram showing detailed contents of the format fields 103, 104. When a value FM of the format fields is "00", the instruction is a two-operation instruction. It means that a sub-instruction specified in the container_0 field 106 is to be executed in a clock cycle just after decoding, and a sub-instruction specified in the container_1 field 107 is to be delayed one clock cycle from the execution of the sub-instruction in the container_0.

When a value FM of the format fields 103, 104 is "01", the instruction is a two-operation instruction. It means that a sub-instruction specified in the container_0 field 106 and a sub-instruction specified in the container_1 field 107 are executed in parallel in a clock cycle just after decoding.

When a value FM of the format fields 103, 104 is "10", the instruction is a two-operation instruction. It means that a sub-instruction specified in the container_1 field 107 is to be executed in a clock cycle just after decoding, and a sub-instruction specified in the container_0 field 106 is to be executed one clock cycle after the execution of the sub-instruction in the container_1.

When a value FM of the format fields 103, 104 is "11", the instruction is a one-operation instruction. It means that one sub-instruction specified in the field composed of the fields 108 and 109 is to be executed in a clock cycle just after decoding.

FIG. 4 is a diagram showing detailed contents of the execution condition field 105. The execution condition field 105 determines whether the sub-instructions specified in the container fields 106 and 107 respectively, and a sub-instruction specified in the container field composed of the fields 108 and 109 are valid or invalid depending on values of status flags F0, F1 of the microprocessor 10 which will be explained later. That the sub-instruction is valid means here that the operation result is reflected onto registers, memories or flags, whereby the operation result defined by the sub-instruction remains. On the contrary, when the operation is invalid, it means that the operation result is not reflected on registers, memories, or flags, whereby the same result as that by a no operation instruction (NOP) remains in the registers or flags irrespective of the kind of the set operation.

When a value CC of the execution condition field 105 is "000", the operation is always valid irrespective of values of the flags F0, F1. When a value CC of the execution condition field 105 is "001", the operation is valid solely if the flag F0 is "10" irrespective of a value of the flag F1. When a value CC of the execution condition field 105 is "010", the operation is valid if both flags F0 and F1 are "10" when a value CC of the execution condition field 105 is "011", the operation is valid only when the flag F0 indicates "10" and the flag F1 is "11". When a value CC of the execution condition field 105 is "101", the operation is valid only when the flag F0 is "11" irrespective of a value of the flag F1. When a value CC of the execution condition field 105 is "110", the operation is valid if the flag F0 is "11" and at the same time, the flag F1 is "10". When a value CC of the execution condition field 105 is "111", the operation is valid only if both flags F0 and F1 are "11". When a value CC of the execution condition field 105 is "100", an operation is undefined, and the value is never used in an instruction.

Figure 5:
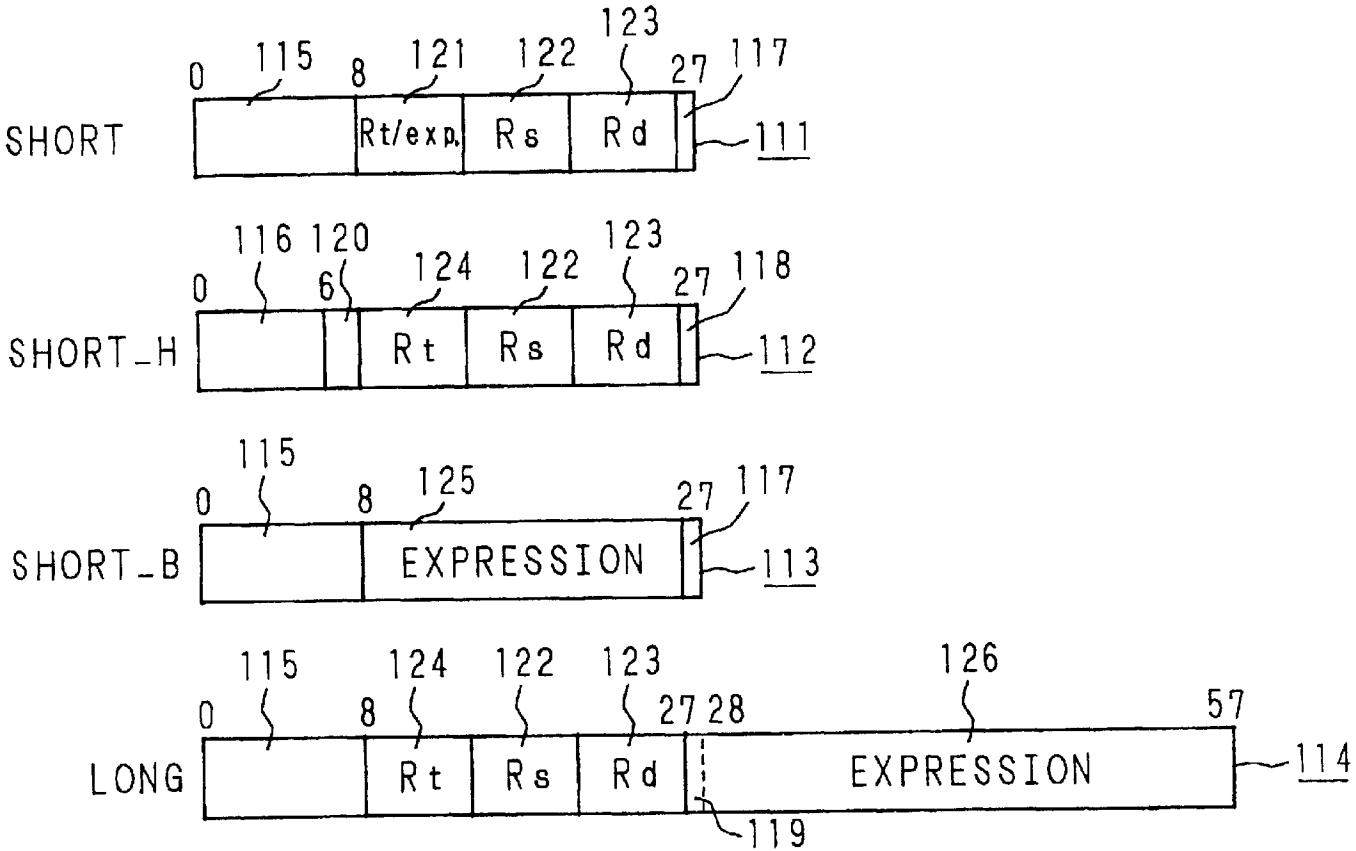
FIG. 5 is a diagram showing an example of the structure of bits of sub-instructions of the microprocessor in the image processing device of the invention.

FIG. 5 is a diagram showing examples of the bit construction of short sub-instructions each expressed by 28 bits, and a long sub-instruction expressed by 58 bits. The short operation field has three types of format 111, 112, 113. The long operation field has one type of format 114.

The format 111 is composed of fields 115, 117 for specifying contents of an operation, a field 121 for specifying a register number or an immediate value of 6 bits, and two fields 122, 123 for specifying register numbers. In a sub-instruction by the format 111 are included an arithmetic operation, a logic operation, a shift operation, and a bit operation between registers and between a register and an immediate value, or a memory access operation, a jump operation or the like for indirect addressing of a register.

The format 112 is for a sub-instruction with 16-bit data in registers. The format 112 is composed of a field 116 for specifying contents of an operation, three fields 122, 123, 124 for specifying register numbers, and modification data 118, 120 to the register numbers. The microprocessor 10 has 64 general-purpose registers of 32 bits in length (refer to FIG. 6) as will be explained later. The 16-bit data is stored in the high halfword (=the most significant 16 bits) or in the low halfword (=the least significant 16 bits) of each general-purpose register. Therefore, a register number and modification data of one bit indicating the storing position being in the high halfword or in the low halfword become necessary to specify a position of an operand of 16 bits on the register. To the modification data of the register number 118, 120 are assigned 3 bits in total for the above indicating purpose. The format 112 is frequently used for processing 16-bit image data.

The format 113 is a format for a branch sub-instruction. The format 113 is composed of fields 115, 117 for specifying contents of an operation and a field 125 for a branch displacement. The operation in the format 113 includes a branch sub-instruction and a subroutine branch sub-instruction.

The format 114 is for an operation requiring a 32-bit branch displacement or a 32-bit immediate value. The format 114 includes a field 115 for specifying contents of an operation, fields 122, 123, 124 for specifying three register numbers, and a field 126 for specifying the branch displacement or immediate value. The format 114 is used for a complicated arithmetic operation, an arithmetic operation employing a large immediate value, a memory access operation by indirect addressing of a register with a large displacement, a branch operation with a large displacement, a jump operation to an absolute address, etc.

Figure 6:
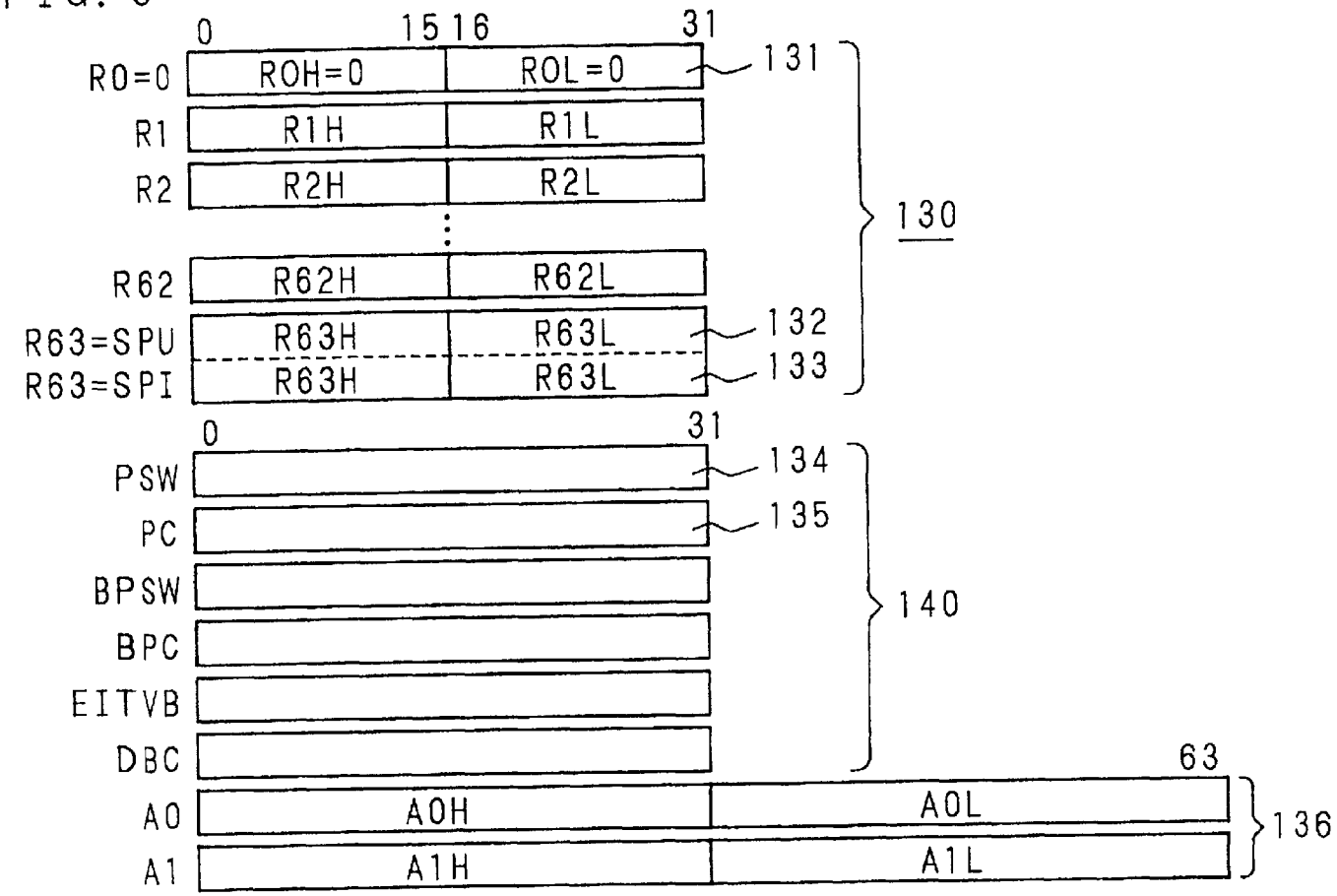
FIG. 6 is a diagram showing an example of the structure of registers of the microprocessor in the image processing device of the invention.

FIG. 6 is a diagram showing an example of the construction of registers in the microprocessor 10. The microprocessor 10 is provided with 64 general-purpose registers (R0–R63) 160 of 32 bits each, 6 control registers 140 of 32 bits, and 2 accumulators 136 of 64 bits. The control registers 140 include a processor status word (PSW) 134, a program counter (PC) 135, and other specialized registers.

In a sub-instruction by the format 112, the high halfword and the low halfword of each of the 64 registers 130 are independently accessible. Moreover, the most significant 32 bits or the least significant 32 bits of the 2 accumulators 136 can be separately accessed from each other. The contents read out from the general-purpose register (RO) 131 is always "0", whereby writing is neglected. The general-purpose register (R63) is a stack pointer (SP) which serves as a user's stack pointer (SPU) 132 or an interruption stack pointer (SPI) 133 depending on a value of an SM field of the PSW 134.

FIG. 7 is a diagram showing detailed contents of the PSW 134. A high halfword field 142 of the PSW 134 includes the SM field for switching the stack pointer, an AT field for controlling whether to translate an address, a DB field for controlling driving of a debugging system, and an IMASK field for controlling the acceptance of an external interruption. A low halfword field 143 of the PSW 134 is a flag field. The flag field 143 has 8 flags. Flags F0 144 and F1 145 control the validity/invalidity of an operation. A value of each flag varies depending on a result of a comparison operation or an arithmetic operation. Further, a value of each flag sometimes varies when the flag is initialized by a flag initializing operation or when an arbitrary value is written in the flag field 143 by an operation writing the flag value. A value in the flag field 143 can be read out through a reading operation.

(2.2) Hardware architecture

Figure 8:
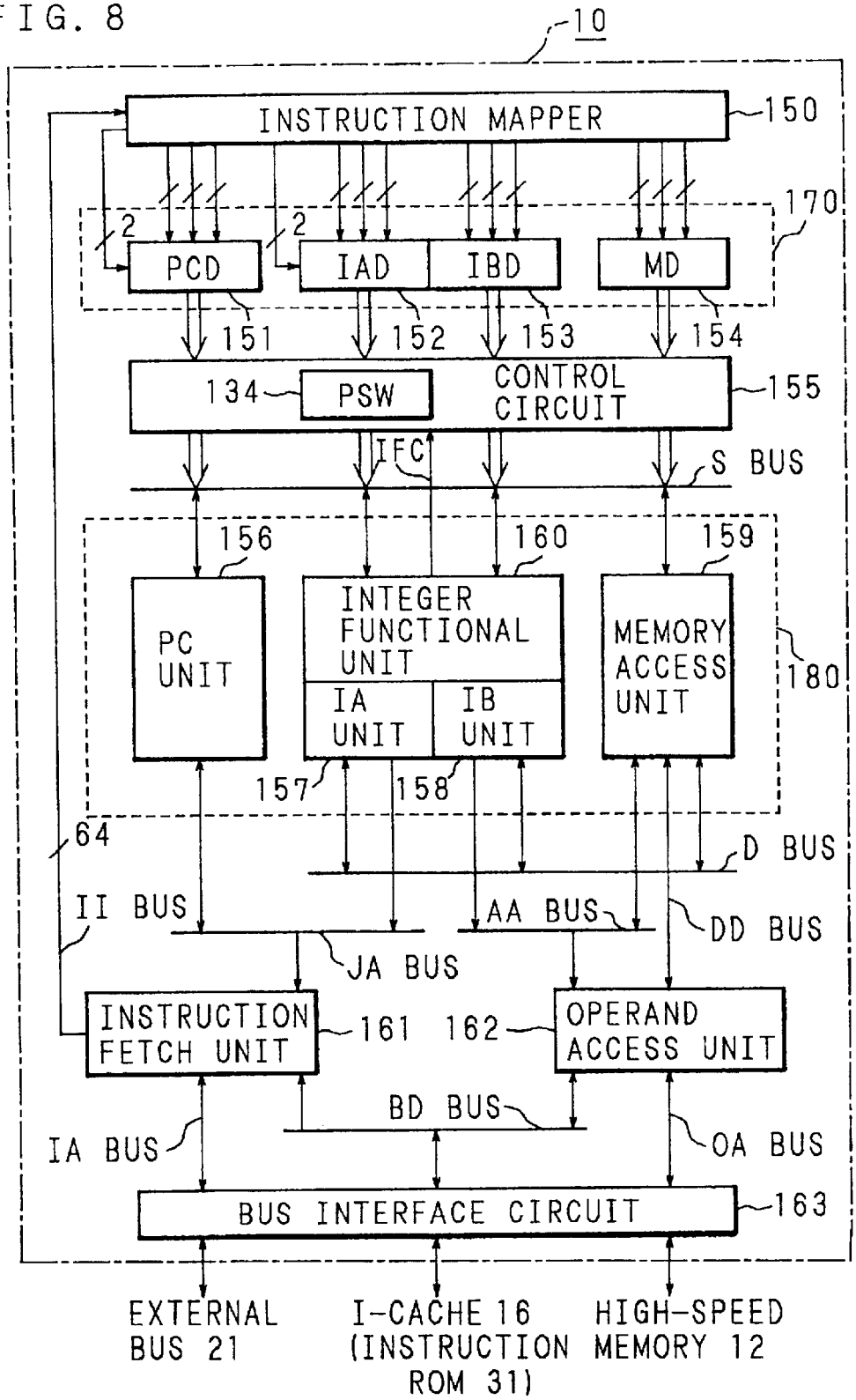
FIG. 8 is a block diagram showing an example of the total structure of the microprocessor in the first embodiment of the image processing device of the invention.

FIG. 8 is a block diagram showing an example of the entire construction of the microprocessor 10 in Embodiment 1.

A bus interface circuit 163 connects the microprocessor 10 to the external bus 21, the instruction cache 16, and the high-speed memory 12. The bus interface circuit 163 is connected inside the microprocessor 10 with an instruction fetch unit 161 via an IA bus and a BD bus, and is also connected to an operand access unit 162 via an OA bus and the BD bus.

The instruction fetch unit 161 fetches an instruction from the instruction cache 16 or from the external memory 2 via the bus interface circuit 163, then transfers the instruction to an instruction mapper 150 via an II bus of 64 bits. The operand access unit 162 fetches data from the high-speed memory 12 or from the external memory 2 through the bus interface circuit 163 to a memory access unit 159, or writes data transferred from the memory access unit 159 to the high-speed memory 12 or to the external memory 2 through the bus interface circuit 163.

The instruction mapper 150 divides the 64-bit instruction transferred from the instruction fetch unit 161 into operation fields according to the format fields 103, 104 included in the instruction (refer to FIGS. 1 and 3). Then, the instruction mapper 150 transfers the divided data to an instruction decoding unit 170 in the specified order. At that time, the instruction mapper 150 relocates each operation field to a corresponding decoder among four decoders 151, 152, 153, and 154 according to the kind of the operation.

The instruction decoding unit 170 is composed of a PCD 151 which is a decoder for decoding codes of a jump operation or a branch operation, an lAD 152 and an lED 153 which are decoders for decoding codes of an operation such as an arithmetic operation or a shift operation relating to operands in general-purpose registers, and an MD 154 which is a decoder for decoding codes of a memory access operation. The decoded results by the decoders 151, 152, 153, and 154 are supplied to a control circuit 155. The control circuit 155 including the PSW 134, controls an operation unit 180 according to both the decoded result by each decoder in the instruction decoding unit 170 and the contents of the PSW 134.

The operation unit 180 is composed of four blocks, that is, a PC unit 156, an integer functional unit 160 consisting of two units, and the memory access unit 159, which respectively correspond to the four decoders 151, 152, 153, and 154 in the instruction decoding unit 170.

The PC unit 156 is provided with the above-mentioned program counter 135 (refer to FIG. 6) or an unshown adder. When an instruction without including a valid jump operation or a valid branch operation is executed, the PC unit 156 calculates a PC value of an instruction to be executed next by adding "8" to a PC value of the currently executed instruction. Or, when a jump operation or a branch operation is executed, the PC unit 156 calculates a PC value of a jumping destination by adding a branch displacement to a PC value of the currently executed instruction or by calculating an address according to an addressing mode specified by the operation.

The integer functional unit 160 is provided with the general-purpose registers 130 with seven ports each, the control registers 140 and the accumulators 136 mentioned earlier (refer to FIG. 6), and a barrel shifter, an ALU, and a multiplier which will be explained later (refer to FIG. 9). The unit 160 consists of two integer functional mechanisms, i.e., IA unit 157 and IE unit 158 which execute integer operations in parallel. The PC unit 156, and the IA unit 157 and IB unit 158 of the integer functional unit 160 work independently, but mutually transmit or receive data via an S bus or a D bus if necessary.

The memory access unit 159 cooperate with the IA unit 157 or the IE unit 158 of the integer functional unit 160 to transmit or receive data to or from the operand access unit 162.

The operation unit 180 is connected to the instruction fetch unit 161 via a JA bus and to the operand access unit 162 via an AA bus and a DD bus thereby to transmit or receive an instruction address, a data address and data to or from the instruction fetch unit 161 and the operand access unit 162, respectively.

Figure 9:
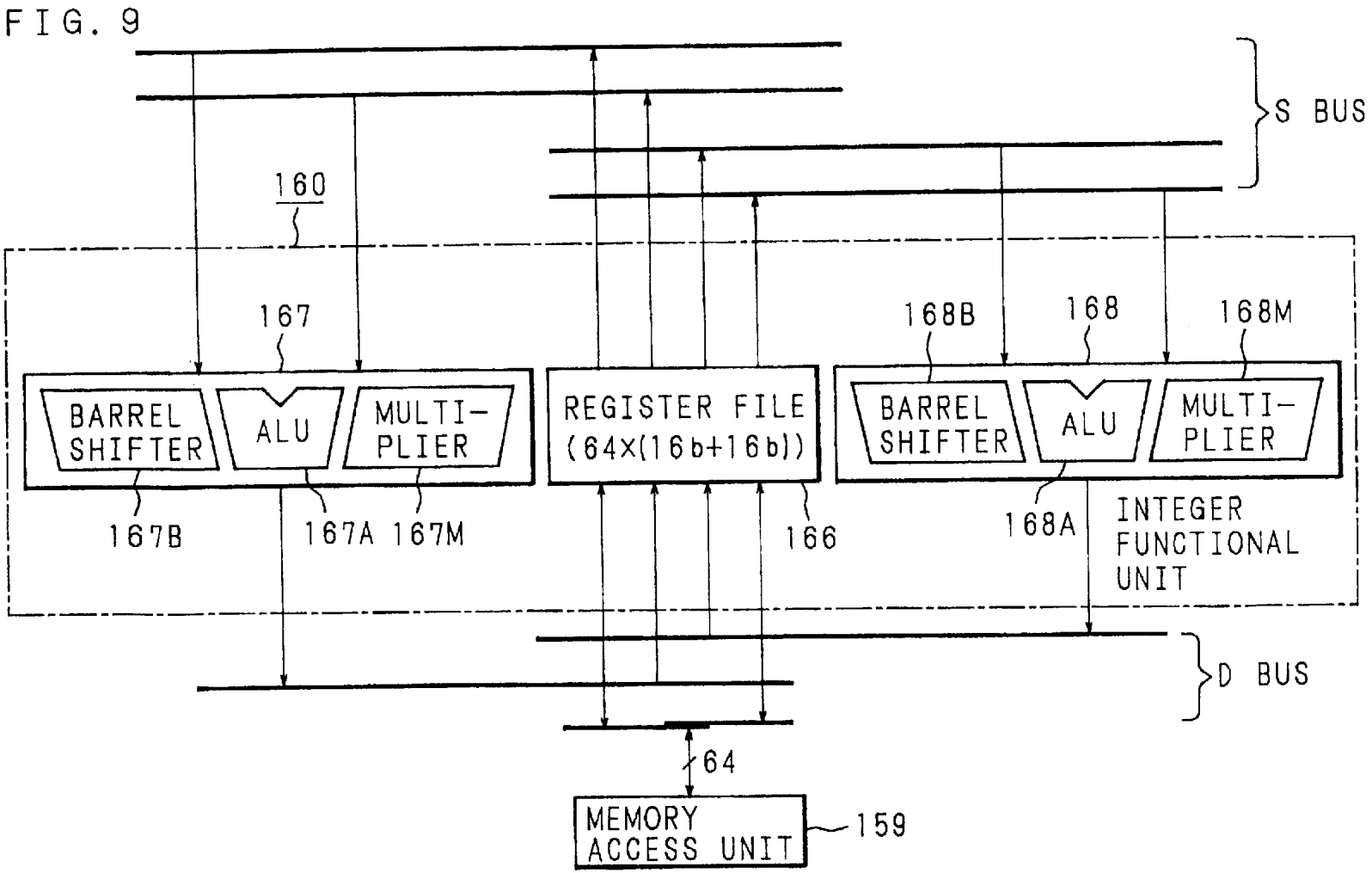
FIG. 9 is a block diagram showing an example of the structure of an integer functional unit of the microprocessor in a first embodiment of the image processing device of the invention.

FIG. 9 is a detailed block diagram showing an example of the construction of the integer functional unit 160 together with the connection relationship between the integer functional unit 160 and the memory access unit 159. The integer functional unit 160 is composed of a register file 166 and two operation units 167, 168.

The register file 166 includes the general-purpose registers 130, the control registers 140 shown in FIG. 6 and mentioned earlier, which are shared by the IA unit 157 and the IB unit 158. The operation unit 167 is included in the IA unit 157 and the operation unit 168 is in the IB unit 158. That is, the IA unit 157 is composed of the operation unit 167 and the register file 166, while the IB unit 158 is composed of the operation unit 168 and the register file 166.

The general-purpose registers 130 in the register file 166 and the operation units 167, 168 are connected via three buses each, whereby two operations are executable independently. The general-purpose registers 130 are connected to the memory access unit 159 via another bus. The operation unit 167 is provided with an ALU 167A, a barrel shifter 167B, and a multiplier 167M, whereas the operation unit 168 is provided with an ALU 168A, a barrel shifter 168B, and a multiplier 168M. It is not shown in the figure, but one of the accumulators 136 is set in the operation unit 167 and the other one of the accumulators 136 is installed in the operation unit 168. The multiplied results by the multipliers 167M, 168M are thus cumulatively added or subtracted and held in the accumulators.

(2) Block loader

Figure 10:
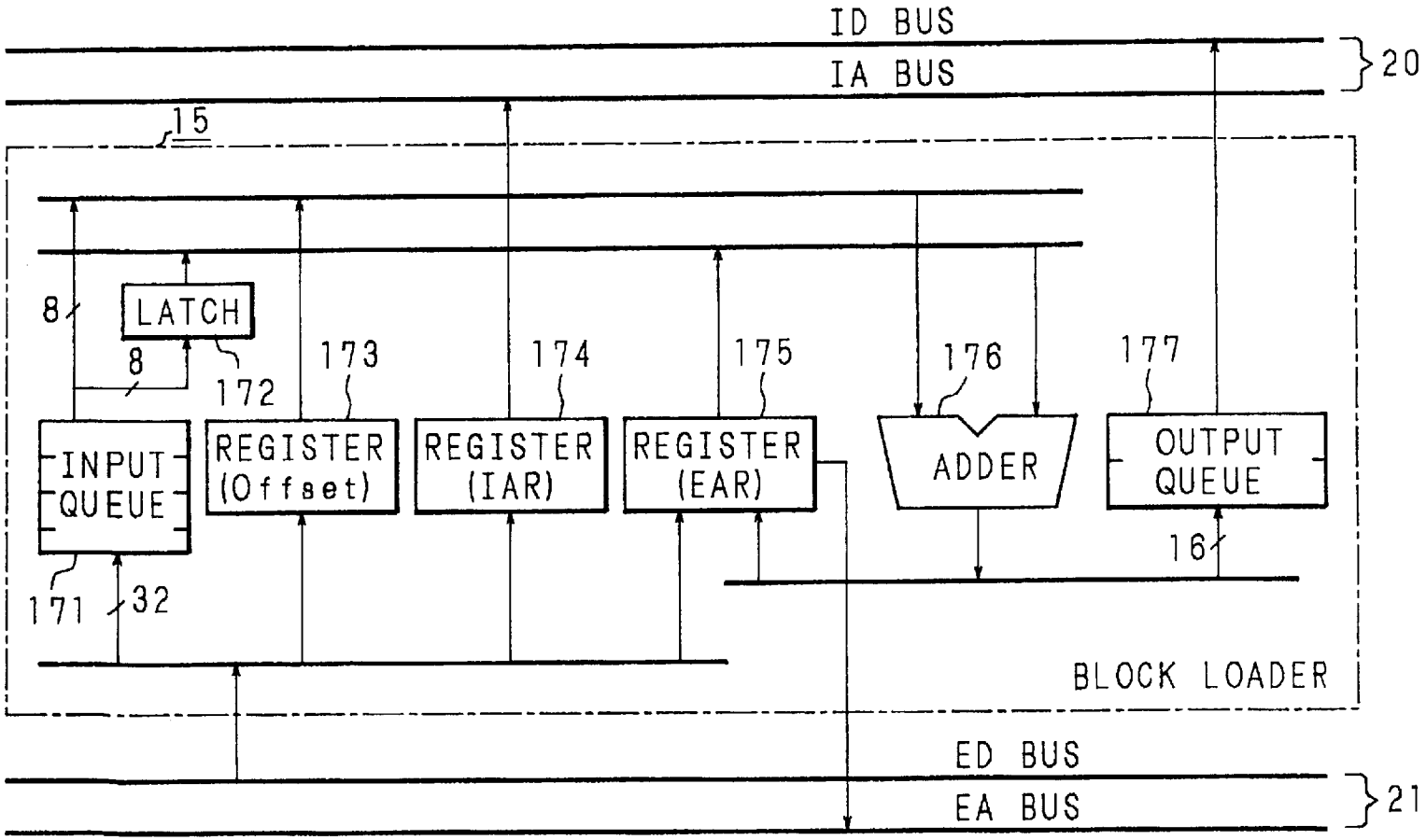
FIG. 10 is a block diagram showing an example of the structure of a block loader of the microprocessor in the first embodiment of the image processing device of the invention.

FIG. 10 is a detailed block diagram showing an example of the construction of the block loader 15. In the figure, an input queue 171 reads and buffers data of 8 bytes or 9 bytes from the external memory 2 every properly arranged 4 bytes, and outputs the data one byte by one byte. However, a length of data read by the input queue 171 from the external memory 2 at one time depends on where a starting address of the data is located to a boundary of the 4 bytes.

A latch 172 latches data of one byte output from the input queue 171 previously to the currently output data.

A register (Offset) 173 is for storing an offset address which is necessary to read out pixel data of the (n+1)th row following that of the n'th row in order to load data of 8×8 pixels block by block from the external memory 2.

A register (IAR) 174 is for holding an address when pixel data is written to either of the high-speed memories 12 and 13. The register 174 has an increment function of address by four. The address held by the register 174 is output to the IA bus of the internal bus 20. A register (EAR) 175 is for holding an address when pixel data is read from the external memory 2. The register 175 having an increment function of an address by four. The address held by the register 175 is output to the EA bus of the external bus 21.

An adder 176 adds output data from the input queue 171 to the data latched by the latch 172, then writes the added result to an output queue 177, or adds values of the registers 173, 175 and writes the added value to the register 175. The output queue 177 buffers two chunks of 16-bit data output form the adder 176 and outputs the data to the high-speed memory 12 or 13 by 4 bytes.

The above-mentioned input queue 171 and registers 173, 174, 175 have an input route from the ED bus of the external bus 21. The input queue 171,. the latch 172, and the registers 173, 175 have an output route to the adder 176. The input queue 171 also has an output route to the latch 172. The adder 176 has further output routes to the register 175 and the output queue 177.

In processing the MPEG standard moving picture data, the frame data is processed by the full pel or by the half pel as interframe predictive data. When processing data by the full pel, the adding process of the data output from the input queue 171 to the data latched by the latch 172 at the adder 176 is unnecessary. In this case, the 8-bit data output from the input queue 171 is extended by the adder 176 to data of 16 bits with zeros and written into the output queue 177.

On the other hand, when the data is processed by the half pel, the 8-bit pixel value output from the input queue 171 is added to the 8-bit pixel value output from the latch 172 at the adder 176, and the sum of the adjacent two pixel values of 16 bits is written into the output queue 177. Therefore, one pixel of the predictive data is always expressed by 16 bits in the block loader 15. In the result, the output queue 177 always writes in the high-speed memory 12 or 13 data where one pixel is 16 bits and every row of the block is constituted of 8 chunks of data whether the predictive data is processed by the half pel or full pel.

(4) Processing example of the MPEG standard moving picture data

Before explaining processing of moving picture data by the image processing device of the invention, how to process the MPEG standard moving picture data (compression of the original picture and decompression to reproduce the original) will be schematically explained below.

(4.1) Outline of processing of the MPEG standard moving picture data

The image processing device of the invention decompresses the coded data obtained by compressing a moving picture image. The coded data is basically input from outside via the serial signal line 27. For such compression of the moving picture data as above, the following three methods are mainly used. A first method is a compression by means of an intraframe correlation utilizing a correlation of pixels in the same frame. A second method is a compression by means of an interframe correlation using a differential value of data of corresponding pixels of frames. The differential value between the corresponding pixels of the frames varies considerably a little as compared with raw data. A third method is a compression depending on an uneven distribution of appearance probabilities of codes, wherein a variable length code (VLC) is used. The third method is applied to the differential data (code) obtained by the second method. Concretely, a code of a short bit length is assigned to data showing a high appearance probability, whereas a code of a long bit length is assigned for a code of data showing a low appearance probability, so that data is compressed in volume.

The first method by means of the intraframe correlation will be explained here. As shown in FIG. 11A, an original picture image of one frame composed of 720×576 pixels is divided into blocks each comprising 8×8=64 pixels, and one of the blocks is shown in FIG. 11A. In the figure, 64 pixels are denoted by $a_1$–$a_{64}$ each of which has a random value at first. Each block of 8×8=64 pixels shown in FIG. 11A is compressed by means of the intraframe correlation. Specifically, the original picture image shown in FIG. 11A is transformed by the discrete cosine transform (DCT) in the first place.

When a so-called orthogonal transform is carried out to a square area of a natural picture image, the natural picture image is gradually transformed sequentially from an average picture image having a uniform pixel value all over the area to a finer picture image. A finer picture image among the thus-obtained picture images of different finesses is named as a picture image of a higher frequency. Therefore, the natural picture image expressed is a pile of a plurality of images obtained through the transform from a lower frequency term (average image) to a higher frequency term.

According to the MPEG standard, the above-mentioned DCT is adopted as one kind of the orthogonal transform. The image subjected to the DCT has a characteristic that large pixel values concentrate on lower frequency terms after the transform although they are scattered at random before the transform. Consequently, it is possible to compress data by removing data of the higher frequency terms from the image data transformed by the DCT. More specifically, transforming of the original picture image of FIG. 11A by the DCT achieves an image data as shown in FIG. 11B which has coefficients $b_1$–$b_{64}$ of pixels arranged zigzag from the lower frequency term to the higher frequency term.

In the next place, the coefficient of each pixel of the image data transformed as above is divided by a prescribed divisor D and the remainder is rounded, thereby to quantize the image data. Accordingly, the image data of one frame is compressed. More concretely, quantizing of the image data transformed by the DCT in FIG. 11B results in image data as shown in FIG. 11e. In the image data in FIG. 11C, only the quotients $c_1$–$c_5$ are obtained in the lower frequency terms and the quotients of the other pixels are all "0". As the coefficients are divided by the prescribed divisor D and the remainder is rounded in the zigzag arrangement of the coefficients $b_1$–$b_{64}$ from the lower frequency term to the higher frequency term as mentioned above. The data of "0" pixels in the image data after the quantization shown in FIG. 11C is compressible.

The compressed image data is processed in an opposite direction to an inverse quantized image data as shown in FIG. 12A, in other words, by multiplying the divisor D used in the quantization for the image data in FIG. 11e. The obtained inverse quantized image data has restored coefficients $b'_1$–$b'_{64}$ of pixels. Further, if the inverse quantized image data is transformed by an inverse DCT, a reproduced image composed of pixels $a'_1$–$a'_{64}$ as shown in FIG. 12A which is almost the same as the original picture is obtained.

The second compressing method by means of the inter-frame correlation will now be explained. In general, differential data between corresponding pixels of frames adjacent in time sequence varies little in comparison with raw data except when a picture changes to a completely different picture. Therefore, if the differential data from data of pixels of the precedent frame is applied to the compression method utilizing the intraframe correlation, the compressing efficiency is proved. Besides, when the differential data is expressed with the use of variable length codes which is the third method to be described below, the data can be compressed further.

The third compression method depending on an uneven distribution of appearance probabilities of codes uses the VLC (variable length code).

In processing the MPEG standard data, the variable length codes are formed to be transmitted or recorded in a recording medium by compressing moving picture data with the utilization of mainly the above-mentioned three compression methods. Therefore, it is necessary to inversely process compressed data in order to reproduce data, in other words, to decompress the compressed data. That is to say, the compressed data should be passed through a decoding process of the compressed (encoded) variable length codes, an inverse quantization by adding differential data of the corresponding pixels between the frames and by multiplying the divisor used in the quantization, and the inverse DCT of the data obtained by the inverse quantization, etc. By these processes, an image almost the same as the original picture is reproduced.

(4.2) Processing example of the MPEG standard moving picture data by the image processing device of the invention.

Encoded data used in processing the MPEG standard data is roughly divided into three kinds; system data relating to the operation of the decoding system, video data, and audio data. Accordingly, it is necessary to decode all three kinds of data in the decoding system decoding the whole MPEG standard data.

Considering loads impressed when the above three kinds of data are decoded, the load at decoding of video data is extremely large whereas the loads at decoding the other two kinds of data are extremely smaller. The video data includes original image data of blocks each comprising 8×8 pixels, modification data of each block data, modification data for constructing one frame by plural blocks, and the like additional data. The load on decoding the additional data is extremely smaller than that on decoding the block data.

From the above fact, in Embodiment 1 of the image processing device of the invention, data except the block data is decoded by the first and second microprocessors 10, 11 only by software. The first and second microprocessors 10, 11, and the peripheral circuits cooperatively decode the every block data of 8×8 pixels according to an algorithm shown in a flowchart of FIG. 13. The process in the flowchart will be now explained in detail.

The variable-length-coded block data received through an external antenna is input serially to the chip 1 of the image processing device of the invention through the serial signal line 27. The serial input circuit 18 converts the input data to parallel data of 32 bits each, and the parallel data is written into the external memory 2 via the external bus 21 to be buffered (S11).

The VLC decoder 14 reads the data written in the external memory 2 via the external bus 21 (S12). The VLC decoder 14 further decodes the data to fixed length data in which one pixel is 8 bits (S13). The block data to be processed by the first microprocessor 10 among the decoded data by the VLC decoder 14 is written in the high-speed memory 12. On the other hand, the block data to be processed by the second microprocessor 11 is written in the high-speed memory 13.

The first microprocessor 10 reads the thus-decoded fixed length data per block from the first high-speed memory 12, whereas the second microprocessor 11 reads the decoded fixed length data from the second high-speed memory 13. Then both microprocessors 10, 11 conduct the inverse quantization in parallel (S14). In the inverse quantization process of the step S14, a block in a matrix wherein index values are arranged zigzag because each pixel data is multiplied by two numbers is transformed to a block in a matrix wherein n (rows)×m (columns) pixels are arranged in the standard order to show an index value (8n+m).

The inverse quantized image data per block is stored in the general-purpose registers 130 of the first and second microprocessors 10, 11 to be used in the next inverse DCT process of the step S15. In the inverse DCT process of the step S15, two-dimensional blocks each of 8×8 pixels which are in charge of the first and second microprocessors 10, 11 are transformed at a high speed using a one-dimensional fast inverse 8-point DCT algorithm.

The description on the one-dimensional fast inverse DCT algorithm is given in detail in "Practical Fast I-DCT Algorithms with 11 Multiplications," (C. Loeffler, A. Ligtenberg, and G. Moschytz: Proc. Int'l Conf. on Acoustics, Speech, and Signal Processing 1989 (ICASSP '89), pp. 988–991).

In the next place, whether to add predictive data to the transformed data is determined according to the modification data attached to the block (S16). This determination depends on whether the currently processed block data is the differential data from the adjacent frame. Specifically, when the currently processed block data is the differential data from the adjacent frame, the predictive data is required to be added to the block data.

When it is determined to add the predictive data in the step S16, the block loader 15 reads out data of the block to be predicted in the adjacent frame from the external memory 2 (S17). Then the block loader 15 writes data of the subject block used by the first microprocessor 10 to the first high-speed memory 12 and data of the block used by the second microprocessor 11 to the second high-speed memory 13, respectively.

In processing the MPEG standard moving picture data, the necessity of addition of the predictive data is indicated by the modification data attached to every 6 chunks of block data. Accordingly, the block loader 15 can start reading the block data to be predicted simultaneously with decoding of each block data. In consequence of this, the block loader 15 can read the predictive data in the step S17 in parallel with the inverse quantization in the step S14 and with the inverse DCT in the step S15.

The first and second microprocessors 10, 11 read out the predictive data from the first and second high-speed memories 12, 13, respectively. The first and second microprocessors 10, 11 add the predictive data to the respective data transformed by the inverse DCT (S18), then write the added data to the external memory 2 as decoded data (S19).

On the contrary, when the predictive data is determined not to be added to the block data in the step S16, the process is directly advanced to the above-mentioned step S19. In this case, the first and second microprocessors 10, 11 write the respective transformed data by the inverse DCT to the external memory 2 as the decoded data.

In the processes of the inverse quantization (S14), the inverse DCT (S15), and the addition of the predictive data (S18), the first and second microprocessors 10, 11 operate similarly though the handling block data are different. Therefore, both microprocessors 10, 11 can execute the processes by handling instructions from the instruction cache 16 in parallel. In the process of writing the decoded data to the external memory 2 (S19), the microprocessors 10, 11 access the external memory 2 at a time different from each other to write data via the external bus 21.

The image data output circuit 17 reads out the decoded data written in the external memory 2 by the frame and outputs the data outside through the bus 28 (S20). If the bus 28 is connected to an input line of an image display device, moving picture images are displayed on the image display device.

Figure 13:
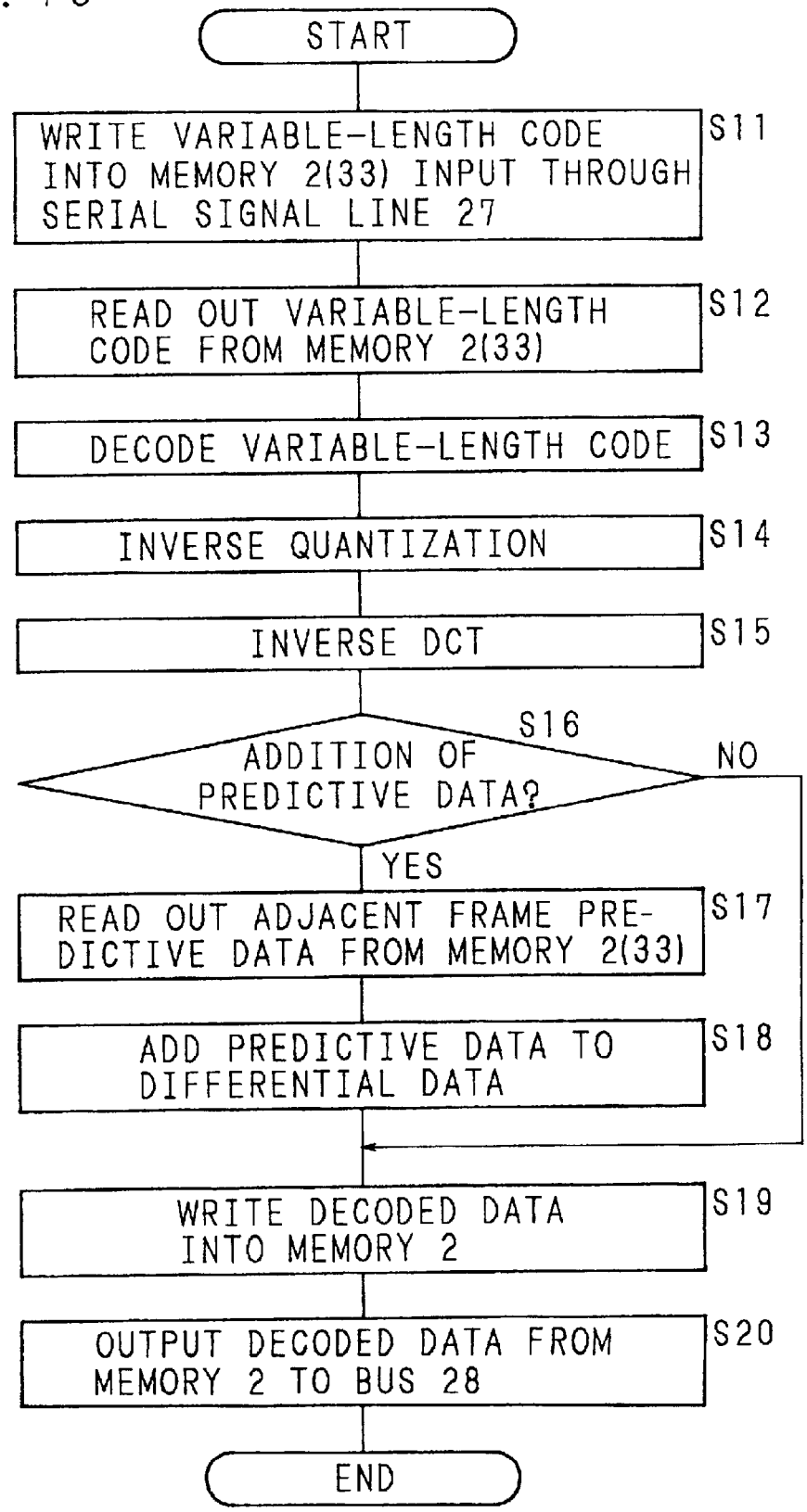
FIG. 13 is a flowchart showing a procedure by block data which is a part of algorithm used when the microprocessor in the first embodiment of the image processing device of the invention processes image data according to the MPEG standard.

Among the above-mentioned processes shown in FIG. 13, the serial input circuit 18 executes the process in the step S11, the VLC decoder 14 executes the processes in the steps S12, S13, the microprocessors 10, 11 execute the processes in the steps S14, S15, S16, S18 and S19, and the image data output circuit 17 executes the process in the step S20.

In order to process the MPEG standard moving picture data, four kinds of hardware, namely, the serial input circuit 18, the VLC decoder 14, the block loader 15, and the microprocessors 10, 11 operate in parallel to successively process many chunks of block data on the basis of the pipeline processing, because each of as many as 5400 chunks of block data is composed of 64 pixels. Further, both microprocessors 10, 11 transfer the block data between the processes in the steps S14–S16, S18, S19 through the general-purpose registers 130, thus eliminating a necessity for loads and stores of intermediate data of the processes.

(5) Effects

In above-mentioned Embodiment 1 fully described as above, four kinds of hardware constructing the image processing device of the invention, that is, the VLC decoder 14, the block loader 15, and the two microprocessors 10, 11 cooperate to process the moving picture data, enabling high-speed processing. Specifically, the VLC decoder 14 decodes variable length codes by hardware which is a process requiring a large quantity of data to be read out from the external memory 2 and difficult to carry out in parallel. The block loader 15 reads out the predictive data from the external memory 2 by hardware which is large in quantity. The two microprocessors 10, 11 transform the data by software through complicated processes, but in parallel.

The above-mentioned block loader 15 in Embodiment 1 is provided with the adder 176 as shown in FIG. 10, thereby to offer an adding function for pixel data. When the predictive data by the half pel is to be read from the external memory 2, the block loader 15 converts the read-out data comprising 9 components in each row by adding the adjacent components, to block data comprising 8 components in each row. As a result, the VLC decoder 14, the block loader 15, and the two microprocessors 10, 11 can process image data at a high speed and with a high efficiency even when processing the predictive data by the half pel.

Further, in the above-mentioned Embodiment 1, the high-speed memories 12, 13 for buffering intermediate processed data are provided between the VLC decoder 14, the block loader 15, and the two microprocessors 10, 11. Both the VLC decoder 14 and the block loader 15 can accordingly preliminarily write data to be required in the future by the two microprocessors 10, 11 in the common high-speed memories 12, 13. The microprocessors 10, 11 can read out necessary data at any time from the high-speed memories 12, 13, respectively, at a high speed.

The block loader 15 in the above-mentioned Embodiment 1 has an extension function of image data with zeros whereby 8-bit data output from the input queue 171 is extended to 16-bit data with zeros by the adder 176, as shown in FIG. 10, and the extended data is written into the output queue 177. Accordingly, when the predictive data by the full pel is read out from the external memory 2, the block loader 15 transforms the read-out block data in which each component is 8 bits and one row is composed of 8 components to a block data of 8 components each of 16 bits by extending each component to 16 bits with zeros, and writes the extended data into the high-speed memories 12, 13. Or, when reading out the predictive data by the half pel from the external memory 2, the block loader 15 transforms the read out block data consisting of 9 components in each row, every component being 8 bits, to block data of 8 components, each of 16 bits, by adding the adjacent components, and writes the transformed data into the high-speed memories 12, 13. Therefore, both microprocessors 10, 11 can process image data at a high speed and with a high efficiency because the processors process data in the same format read from the high-speed memories 12, 13 both for the predictive data by the half pel and for the predictive data by the full pel.

Both of the microprocessors 10, 11 in the above-mentioned Embodiment 1 read out the same instructions from the common instruction cache 16 in parallel thereby to execute the image processing program. Hence, both microprocessors 10, 11 share a large portion of the program, so that a necessary storage capacity is reduced in comparison with a case where the two microprocessors 10, 11 have their own instruction caches.

[Embodiment 2]

(1) Entire architecture

Figure 14:
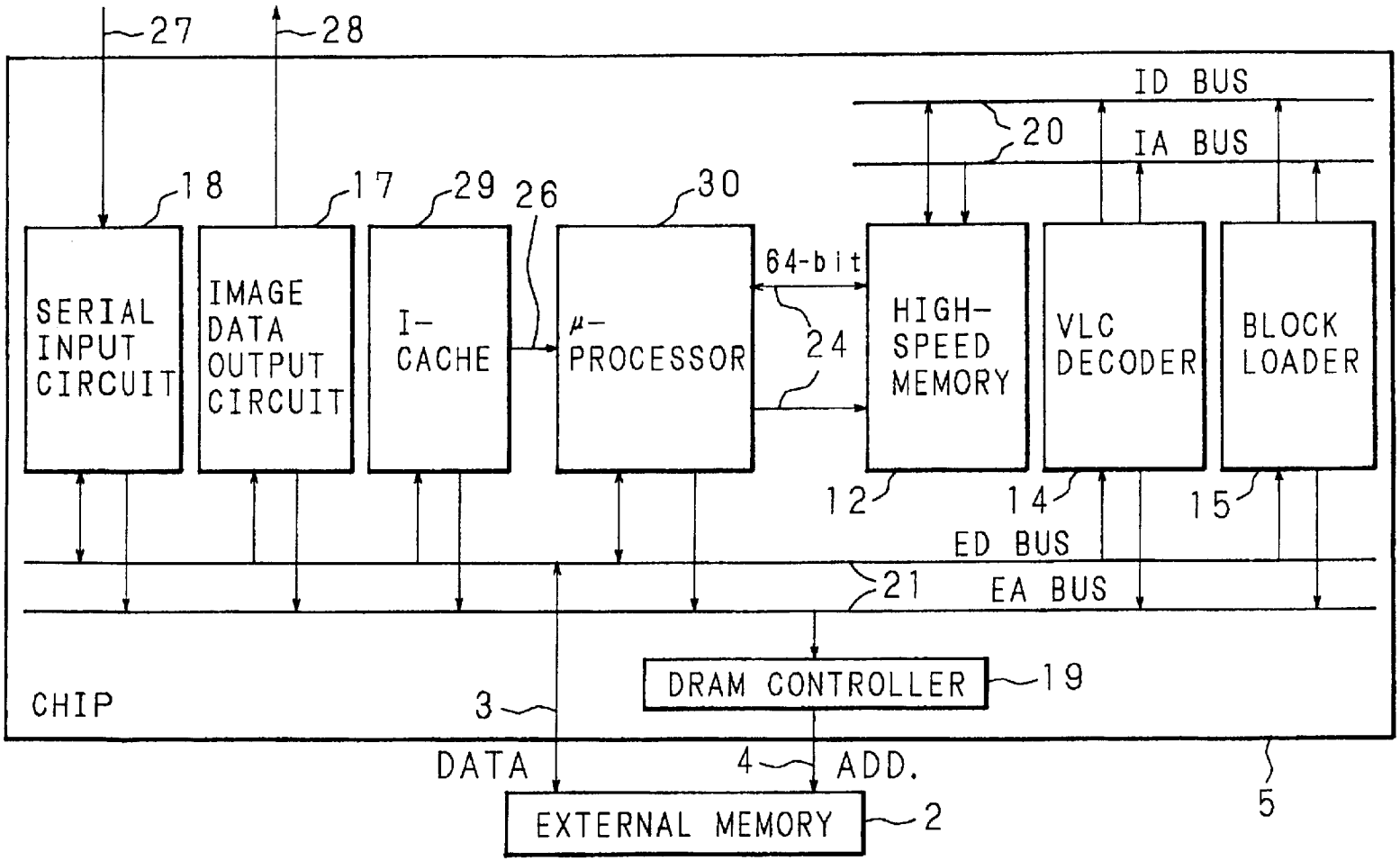
FIG. 14 is a block diagram showing an example of the configuration of a system including a second embodiment of an image processing device of the invention connected to a memory.

FIG. 14 is a block diagram showing an example of the construction of a second embodiment of the image processing device of the invention in a system, to which a memory is connected. In the figure, numeral 5 denotes a chip on which is mounted the image processing device of the invention, which is connected to the external memory 2 composed of a plurality of DRAM chips via the data bus 3, the address bus 4 and the like, similar to Embodiment 1.

The image processing device of Embodiment 2 is provided with one microprocessor 30 instead of the microprocessors 10, 11 in Embodiment 1 which has a processing speed twice as fast as that of the microprocessors 10, 11. Therefore, one high-speed memory 12 is sufficient in this embodiment. Further, an instruction cache 29 exclusive for the microprocessor 30 is provided instead of the common instruction cache 16 in Embodiment 1 supplying instructions to both microprocessors 10, 11. The high-speed memory 12 and the microprocessor 30 are connected by a bus 24.

Though two microprocessors 10,11 are used in the image processing device of Embodiment 1, one microprocessor 30 is enough so long as the microprocessor 30 in the image processing device of this embodiment is at least twice as efficient as the microprocessor 10, 11. Accordingly, the two high-speed memories 12, 13 in the image processing device of Embodiment 1 may be replaced with one memory.

Figure 15:
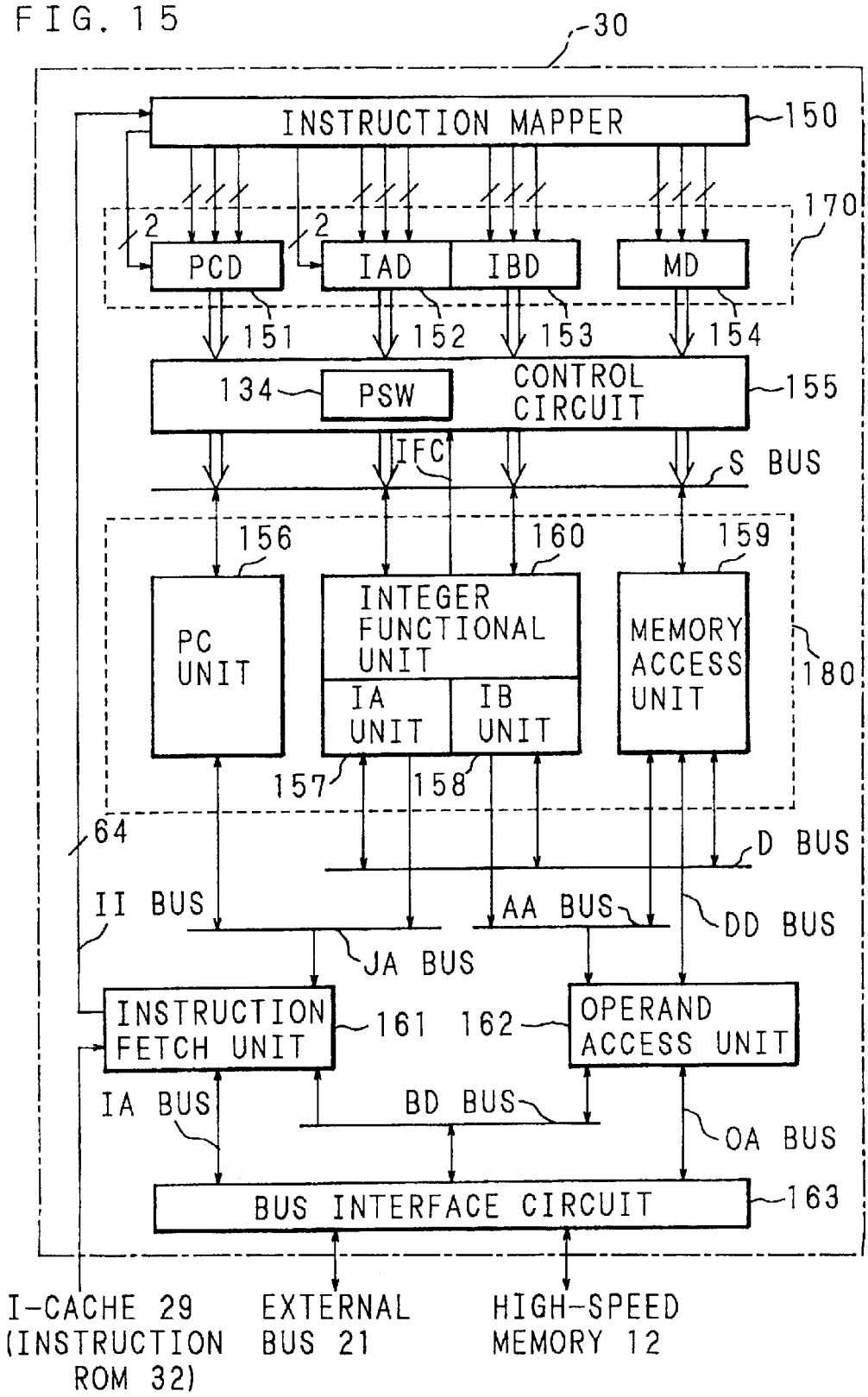
FIG. 15 is a block diagram showing an example of the whole structure of a example of an entire microprocessor in the second embodiment of the image processing device of the invention.

FIG. 15 is a block diagram showing the entire architecture of the microprocessor 30 in the second embodiment of the image processing device of the invention. In the embodiment, the instruction set and the construction of registers of the microprocessor 30 are similar to those in the microprocessors 10, 11 in Embodiment 1.

A difference in the microprocessor 30 of the image processing device of Embodiment 2 from the microprocessor 10(11) of Embodiment 1 is a connection between the bus interface circuit 163 and the instruction fetch unit 161. The instruction fetch unit 161 in the microprocessor 30 determines to access whether the instruction cache 29 or the external memory 2 via the bus interface circuit 163 in compliance with an instruction address, thereby to fetch an instruction from the instruction cache 29 or from the external memory 2. Accordingly, the instruction fetch unit 161 has a direct route for reading an instruction from the instruction cache 29 whereas the bus interface circuit 163 has no such route for reading an instruction from the instruction cache 29.

(2) Processing example of the MPEG standard moving picture data

When the image processing device of Embodiment 2 processes the MPEG standard moving picture data, processes are similar to those in Embodiment 1 except a process of decoding block data of 8×8 pixels each. However, even the decoding process is basically the same as in Embodiment 1 shown in FIG. 13. A sole difference is that one microprocessor 30 in place of the two microprocessors 10, 11 in Embodiment 1 executes the processes in the steps S14, S15, S16, S18 and S19 in Embodiment 2.

(3) Effects

In the above-mentioned Embodiment 2, three kinds of hardware consisting the image processing device of the invention, that is, the VLC decoder 14, the block loader 15, and the microprocessor 30 cooperate to process moving picture data, realizing high-speed processing. Specifically, the VLC decoder 14 decodes variable length codes by hardware which requires reading of a large amount of data from the external memory 2 and is hard to execute in parallel. The block loader 15 reads out the predictive data from the external memory 2 by hardware, although the predictive data is of a large quantity. The microprocessor 30 transforms the data by software.

Further, in the above-mentioned Embodiment 2, the high-speed memory 12 for buffering intermediate processed data is provided between the VLC decoder 14 and the block loader 15, and the microprocessor 30. As a result, the VLC decoder 14 and the block loader 15 can preliminarily write data to be required by the microprocessor 30 in the high-speed memory 12. Accordingly, the microprocessor 30 can read out necessary data at any time from the high-speed memory 12 at a high speed.

At the same time, the construction of the above-mentioned block loader 15 in Embodiment 2 is the same as in Embodiment 1 shown in FIG. 10. Hence, needless to say, the block loader 15 has the adding function of pixel data and the extension function of pixel data with zeros similar to in Embodiment 1, with the same effects exerted as in Embodiment 1.

[Embodiment 3]

(1) Entire architecture

Figure 16:
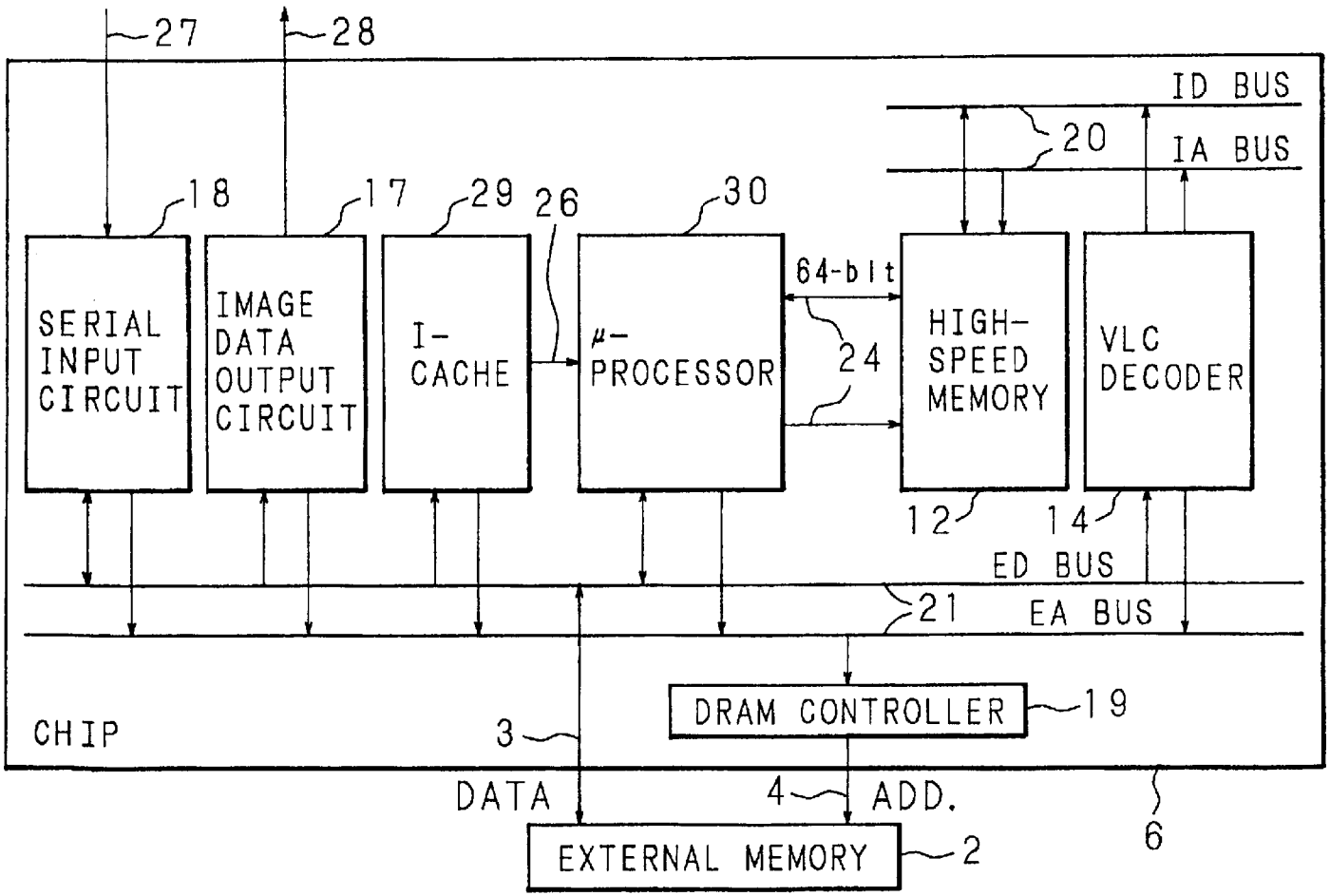
FIG. 16 is a block diagram showing an example of the configuration of a system including a third embodiment of an image processing device of the invention connected to a memory.

FIG. 16 is a block diagram showing an example of the construction of a third embodiment of the image processing device of the invention in a system, to which is connected a memory. In the figure, numeral 6 denotes a chip on which is mounted the image processing device of the invention, which is connected to the external memory 2 composed of a plurality of DRAM chips via the data bus 3, the address bus 4 and the like, similar to the embodiments mentioned earlier.

The image processing device of the invention in this embodiment has the construction in which the block loader 15 is removed from the second embodiment of the image processing device shown in FIG. 14. Therefore, though it is necessary for the microprocessor 30 of the image processing device in this embodiment to directly read out the predictive data from the external memory 2, which requires a faster speed than that of the microprocessor 30 in Embodiment 2, an amount of hardware required by the block loader 15 is eliminated. However, the microprocessor 30 reads out the predictive data from the external memory 2 by software, and therefore no additional function is never necessitated in the microprocessor 30.

(2) Processing example of the MPEG standard moving picture data

When the image processing device of Embodiment 3 processes the MPEG standard moving picture data, processes are similar to those in Embodiment 1 except a process of decoding every block data of 8×8 pixels. Even the process of decoding is basically the same as in Embodiment 1 shown in FIG. 13. Differences are that one microprocessor 30 in Embodiment 3 instead of the two microprocessors 10, 11 in Embodiment 1 executes the processes in the steps S14, S15, S16, S18 and S19 of FIG. 13, and that the microprocessor 30 also executes the process in the step S17 by software although the process is executed by the block loader 15 by hardware in Embodiment 3.

(3) Effects

In the above-mentioned Embodiment 3, two kinds of hardware constructing the image processing device of the invention, that is, the VLC decoder 14 and the microprocessor 30 cooperate operate to process moving picture data, thereby achieving a high speed. Specifically, the VLC decoder 14 decodes variable length codes by hardware, which is a process requiring a large amount of data to be read out from the external memory 2 and hard to perform in parallel. The microprocessor 30 transforms the data and reads out the predictive data from the external memory 2 by software.

Further, in the above-mentioned Embodiment 3, the high-speed memory 12 for buffering intermediate processed data is provided between the VLC decoder 14 and the microprocessor 30. As a result, the VLC decoder 14 can preliminarily write data to be necessitated by the microprocessor 30 in the high-speed memory 12. Accordingly, the microprocessor 30 can read out necessary data at any time from the high-speed memory 12 at a high speed.

[Embodiment 4]

(1) Entire architecture

Figure 17:
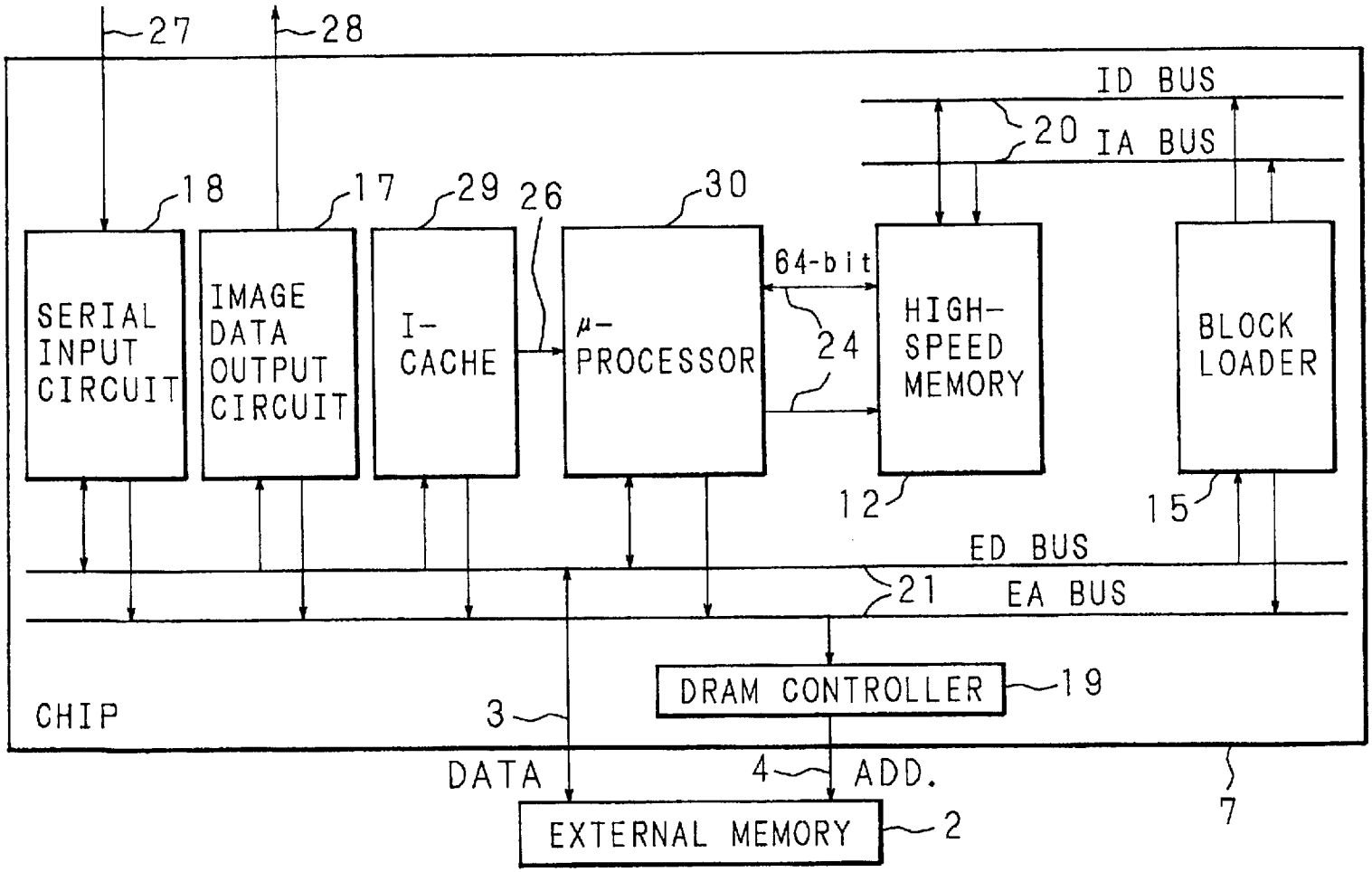
FIG. 17 is a block diagram showing an example of the configuration of a system including a fourth embodiment of an image processing device of the invention connected to a memory.

FIG. 17 is a block diagram showing an example of the construction of a fourth embodiment of the image processing device of the invention in a system, to which is connected a memory. In the figure, numeral 7 denotes a chip on which is mounted the image processing device of the invention, which is connected to the external memory 2 composed of a plurality of DRAM chips via the data bus 3, the address bus 4 and the like, similar to the embodiments stated earlier.

The image processing device of the invention in this embodiment has the construction in which the VLC decoder 14 is removed from the second embodiment of the image processing device shown in FIG. 14. Therefore, though the microprocessor 30 of the image processing device in this embodiment is required to directly read out the variable length codes from the external memory 2 and to decode the variable length codes to data of fixed length codes, which necessitates a processing speed faster than that of the microprocessor 30 in Embodiment 2, an amount of hardware required by the VLC decoder 14 is eliminated. However, the microprocessor 30 decodes the variable length codes by software, and no function is to be added to the microprocessor 30.

(2) Processing example of the MPEG standard moving picture data

When the image processing device of Embodiment 4 processes the MPEG standard moving picture data, processes are similar to those in Embodiment 1 except a process of decoding every block data of 8×8 pixels. Even the process of decoding is basically the same as in Embodiment 1 shown in FIG. 13. Differences are that one microprocessor 30 instead of the two microprocessors 10, 11 executes the processes in the steps S14, S15, S16, S18 and S19 of FIG. 13, and that the microprocessor 30 also executes both processes in the steps S12 and S13 by software instead of by the VLC decoder 14 by hardware.

(3) Effects

In the above-mentioned Embodiment 4, two kinds of hardware constructing the image processing device of the invention, that is, the block loader 15 and the microprocessor 30 cooperatively process moving picture data at a high speed. Specifically, the block loader 15 reads out the predictive data from the external memory 2 by hardware, which requires reading of a large amount of data. The microprocessor 30 transforms the data and decodes variable length codes by software.

Further, in the above-mentioned Embodiment 4, the high-speed memory 12 for buffering intermediate processed data is provided between the block loader 15 and the microprocessor 30. As a result, the block loader 15 can preliminarily write data to be necessitated by the microprocessor 30 in the high-speed memory 12. Accordingly, the microprocessor 30 can read out necessary data at any time from the high-speed memory 12 at a high speed.

Besides, the construction of the above-mentioned block loader 15 in Embodiment 4 is the same as in Embodiment 1 shown in FIG. 10. It is needless to say that the block loader 15 has the adding function of pixel data and the extension function of pixel data with zeros, similar to Embodiment 1, with effects also similar to Embodiment 1.

[Embodiment 5]

(1) Entire architecture

Figure 18:
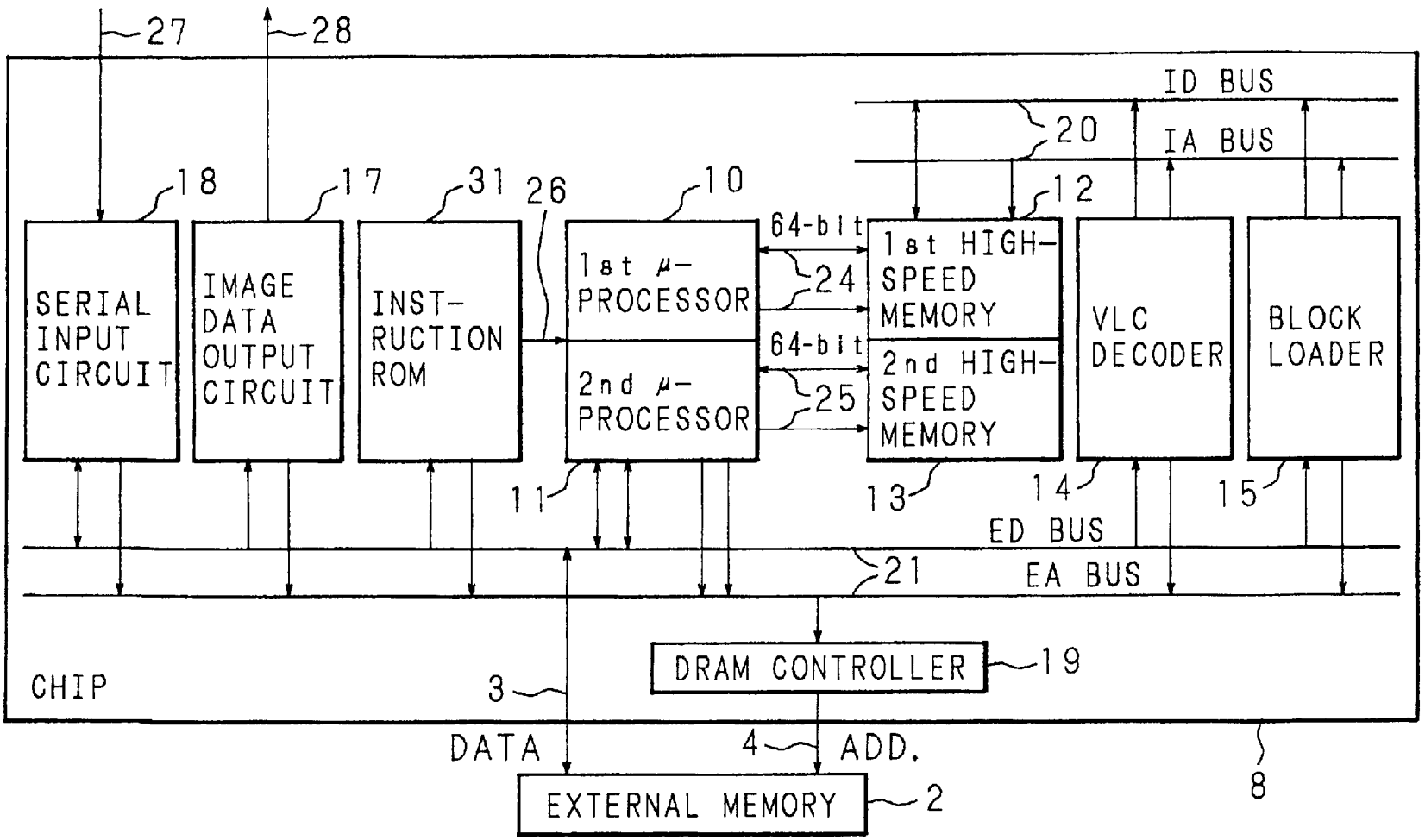
FIG. 18 is a block diagram showing an example of the configuration of a system including a fifth embodiment of an image processing device of the invention connected to a memory.

FIG. 18 is a block diagram showing an example of the construction of a fifth embodiment of the image processing device of the invention in a system, to which a memory is connected. In the figure, numeral 8 denotes a chip on which is mounted the image processing device of the invention which is connected to the external memory 2 composed of a plurality of DRAM chips via the data bus 3, the address bus 4 and the like, similar to the foregoing embodiments.

The image processing device of Embodiment 5 has the construction in which the instruction cache 16 in the first embodiment of the image processing device in FIG. 1 is replaced with an instruction ROM 31. The instruction ROM 31 stores portions of the program executed by the first and second microprocessors 10, 11, e.g., processes in the steps S14, S15, S16, S18 and S19 shown in FIG. 13 which are especially necessary to process at a high speed. The instruction ROM 31 can supply either one of the first and second microprocessors 10, 11 with the instruction or can supply both microprocessors 10, 11 with the same instruction in parallel. Both of the microprocessors 10, 11 fetch instructions from the external memory 2 as well as from the instruction ROM 31 and execute the instructions.

Both microprocessors 10, 11 of the image processing device of Embodiment 5 have the same construction as in Embodiment 1 shown in FIG. 8 except a connection of the bus interface circuit 163 with the outside. The instruction set and the construction of registers are similar to those in the above-mentioned Embodiment 1. A difference is that the bus interface circuit 163 is connected to the external bus 21, to the first high-speed memory 12 and to the instruction ROM 31 as a result of the replacement of the instruction cache 16 with the instruction ROM 31. Accordingly, the bus interface circuit 163 determines to access the instruction ROM 31 or the external memory 2 according to an instruction address, thereby to fetch the instruction from either the instruction ROM 31 or the external memory 2.

(2) Processing example of the MPEG standard moving picture data

When the image processing device of Embodiment 5 processes the MPEG standard moving picture data, processes are similar to those in Embodiment 1 except a process of decoding every block data of 8×8 pixels. Even the process of decoding is basically the same as in Embodiment 1. A difference is that both microprocessors 10, 11 fetch an instruction from either of the instruction ROM 31 and the external memory 2 according to the instruction address. The microprocessors 10, 11 execute the same instructions supplied from the instruction ROM 31 in parallel in the steps S14, S15, S16 and S18 of FIG. 13.

(3) Effects

In this embodiment, the two microprocessors 10, 11 read out the same instructions in parallel from the common instruction ROM 31 thereby to execute the image processing program. Hence, both microprocessors 10, 11 can share a large portion of the image processing program thereby to reduce a storage capacity in comparison with a case where the two microprocessors 10, 11 have their own instruction ROMs.

[Embodiment 6]

(1) Entire architecture

Figure 19:
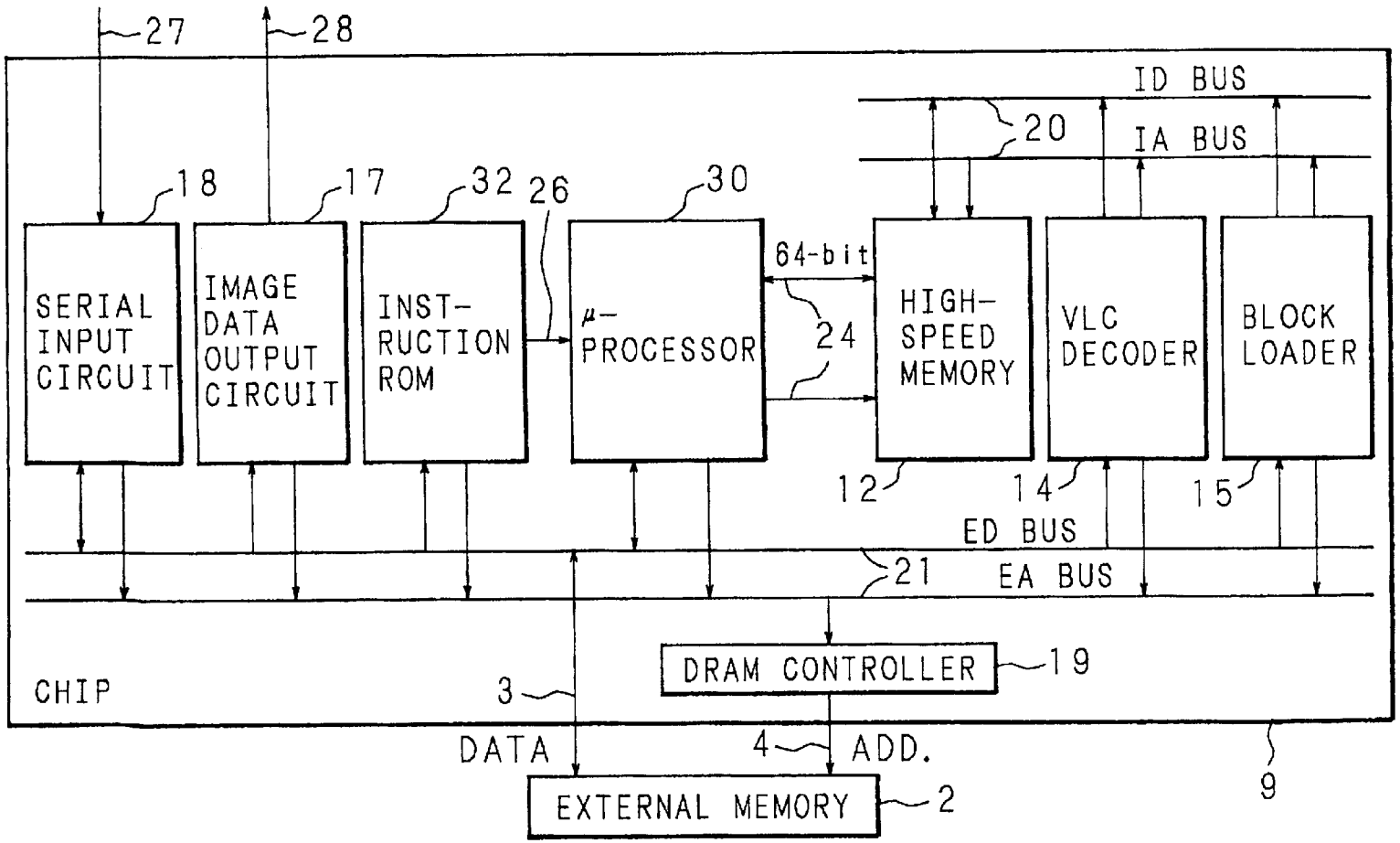
FIG. 19 is a block diagram showing an example of the configuration of a system including a sixth embodiment of an image processing device of the invention connected to a memory.

FIG. 19 is a block diagram showing an example of the construction of a sixth embodiment of the image processing device of the invention in a system, to which is connected a memory. In the figure, numeral 9 denotes a chip on which is mounted the image processing device of the invention, which is connected to the external memory 2 composed of plurality of DRAM chips via the data bus 3, the address bus 4 and the like, similar to the embodiments described above.

The image processing device in Embodiment 6 has the construction in which the instruction cache 29 in the image processing device of Embodiment 2 is replaced with an instruction ROM 32. The instruction ROM 32 stores portions of the program executed by the microprocessor 30, such as processes in the steps S14, S15, S16, S18 and S19 shown in FIG. 13 which are especially necessary to process at a high speed. The microprocessor 30 fetches an instruction from either the instruction ROM 32 or the external memory 2 and executes the instruction.

The microprocessor 30 of the image processing device of Embodiment 6 has the same construction as in Embodiment 2 shown in FIG. 15 except a connection of the instruction fetch unit 161. The instruction set and the construction of registers are similar to those in the above-mentioned Embodiment 2. A difference is that the instruction fetch unit 161 is connected to the instruction ROM 32, not to the instruction cache 29 as a result of the replacement of the instruction cache 16 with the instruction ROM 32. Accordingly, the instruction fetch unit 161 determines to access the instruction ROM 32 or the external memory 2 via the bus interface circuit 163 according to an instruction address, thereby to fetch the instruction from either the instruction ROM 32 or the external memory 2.

(2) Processing example of the MPEG standard moving picture data

When the image processing device of Embodiment 6 processes the MPEG standard moving picture data, processes are totally the same as those in Embodiment 1 except a process of decoding 8×8 pixel block data. Even the process of decoding is basically the same as in Embodiment 1 shown in FIG. 13. Differences are that one microprocessor 30 instead of two microprocessors 10, 11 executes the processes in the steps S14, S15, S16, S18 and S19 of FIG. 13, and that the microprocessor 30 fetches an instruction from either the instruction ROM 32 or the external memory 2 according to the instruction address.

(3) Effects

In this embodiment, the microprocessor 30 reads out the instruction especially necessary to process at a high speed from the instruction ROM 32 having a larger storage capacity per unit area than the instruction cache and having an access speed equivalent to that of the instruction cache to execute the image processing program. Therefore, the realized image processing device occupies a smaller area on the chip in comparison with a device using the instruction cache.

[Embodiment 7]

(1) Entire architecture

Figure 20:
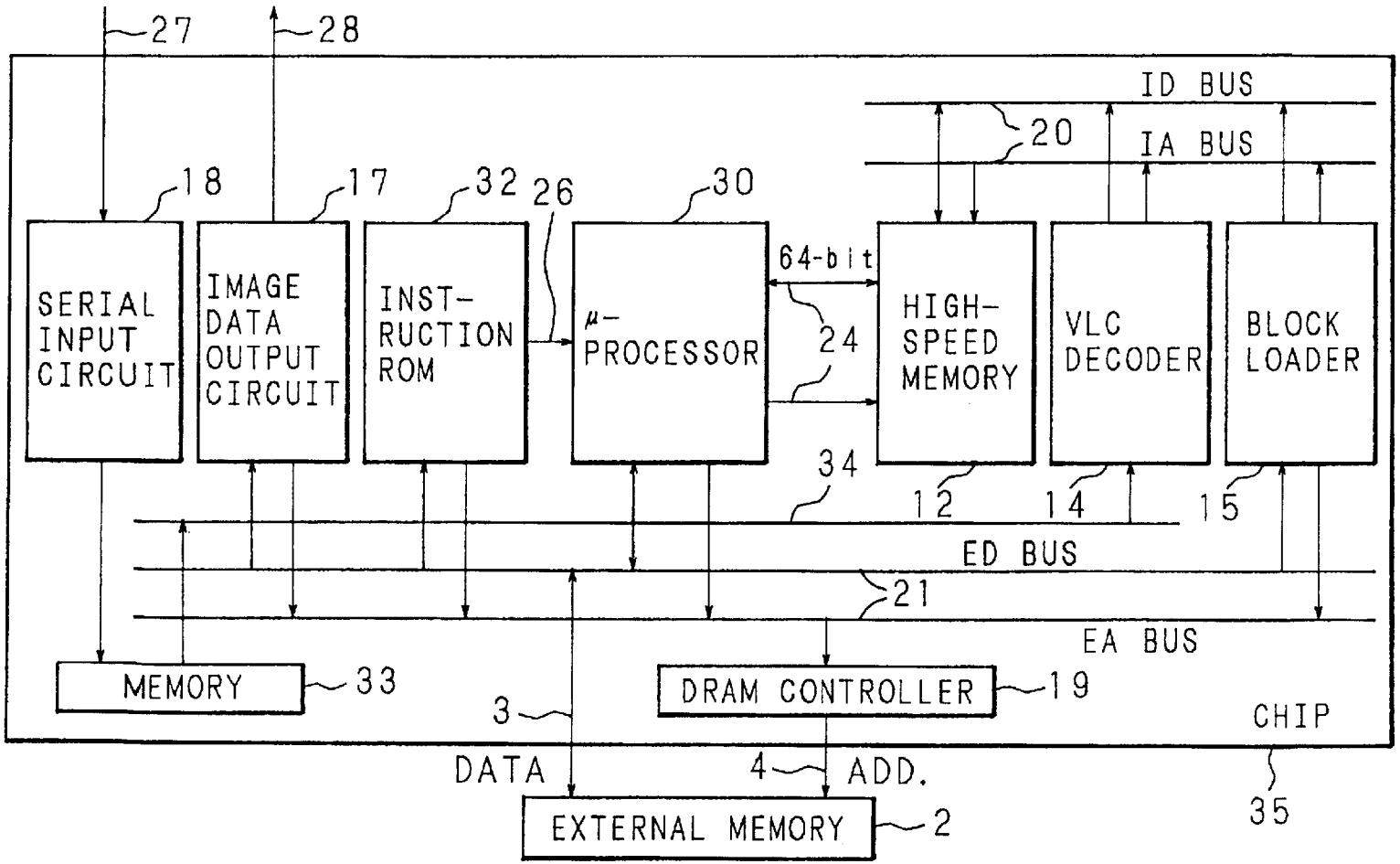
FIG. 20 is a block diagram showing an example of the configuration of a system including a seventh embodiment of an image processing device of the invention connected to a memory.

FIG. 20 is a block diagram showing an example of the construction of a seventh embodiment of the image processing device of the invention in a system, to which is connected a memory. In the figure, numeral 35 denotes a chip on which is mounted the image processing device of the invention, which is connected to the external memory 2 composed of a plurality of DRAM chips via the data bus 3, the address bus 4 and the like, similar to the embodiments mentioned earlier.

The image processing device of Embodiment 7 has the construction in which a memory 33 is added to the above-mentioned image processing device of Embodiment 6 shown in FIG. 19, with a bus 34 for inputting a signal output from the memory 33 to the VLC decoder 14. In the device, the memory 33 buffers variable length code data which is an output signal from the serial input circuit 18, and the VLC decoder 14 reads out the buffered data from the memory 33 via the bus 34. That is, the variable length code signal input into the image processing device on the chip 35 through the serial input circuit 18 is buffered in the memory 33, not in the external memory 2.

(2) Processing example of the MPEG standard moving picture data

The image processing device of Embodiment 7 processes the MPEG standard moving picture data in almost the same way as in the above-mentioned Embodiment 6. Differences are that the variable length codes are written into the memory 33, not in the external memory 2 in the process corresponding to that in the step S11 of FIG. 13, and that the variable length codes are read out from the memory 33, not from the external memory 2 in the process corresponding to that in the step S12 of FIG. 13.

(3) Effects

The device of Embodiment 7 is provided with the specialized memory 33 for buffering the variable length codes, which eliminates the necessity for the serial input circuit 18 and the VLC decoder 14 to access the external memory 2. Accordingly, controlling of the access right to the external memory 2 via the external bus 21 becomes simpler in comparison with Embodiment 6.

[Embodiment 8]

(1) Entire architecture

Figure 21:
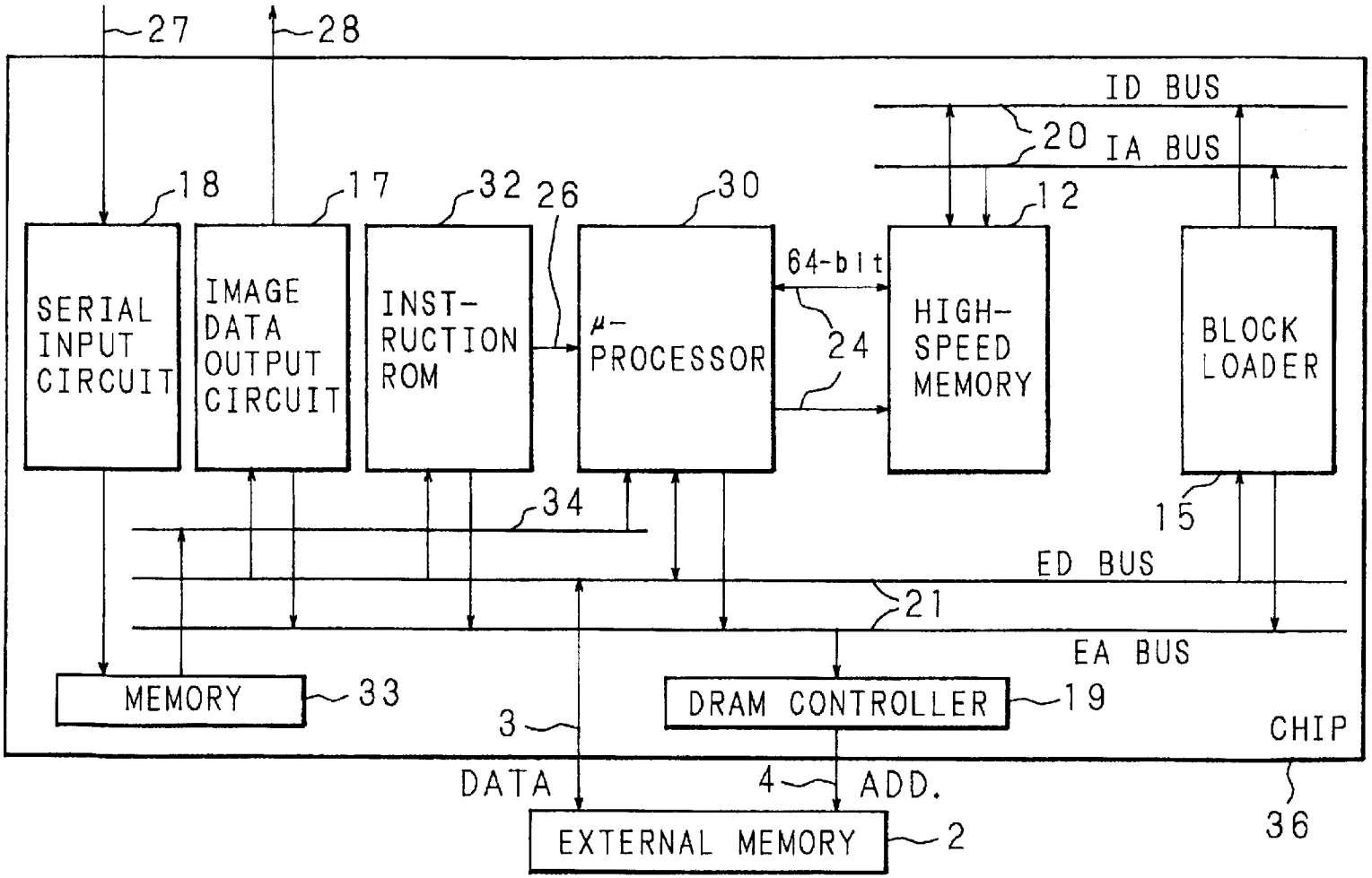
FIG. 21 is a block diagram showing an example of the configuration of a system including an eighth embodiment of an image processing device of the invention connected to a memory.

FIG. 21 is a block diagram showing an example of the construction of an eighth embodiment of the image processing device of the invention in a system, to which is connected a memory. In the figure, numeral 36 denotes a chip on which is mounted the image processing device of the invention which is connected to the external memory 2 composed of a plurality of DRAM chips via the data bus 3, the address bus 4 and the like, similar to the embodiments mentioned earlier.

The image processing device of Embodiment 8 mounted on the chip 36 has the construction in which the same memory 33 and bus 34 as in the above-mentioned Embodiment 7 are added to the image processing device of Embodiment 4 having no VLC decoder 14 of FIG. 17. In the device of Embodiment 8, the bus 34 directly connects the memory 33 and the microprocessor 30. Specifically, the memory 33 buffers the variable length code data output from the serial input circuit 18, then the microprocessor 30 directly reads out the buffered data from the memory 33 through the bus 34.

(2) Processing example of the MPEG standard moving picture data

The image processing device of Embodiment 8 processes the MPEG standard moving picture data in almost the same way as in the above-mentioned Embodiment 4. Differences are that the variable length codes are written into the memory 33, not into the external memory 2 in the process corresponding to that in the step S11 of FIG. 13, and that the variable length codes are read out from the memory 33 instead of from the external memory 2 in the process corresponding to that in the step S12 of FIG. 13.

(3) Effects

The device of Embodiment 8 is provided with the specialized memory 33 for buffering the variable length codes, which makes it unnecessary for the serial input circuit 18 to access the external memory 2. Accordingly, controlling of the access right to the external memory 2 via the external bus 21 becomes simpler in comparison with Embodiment 4.

(1) Entire architecture

[Embodiment 9]

Figure 22:
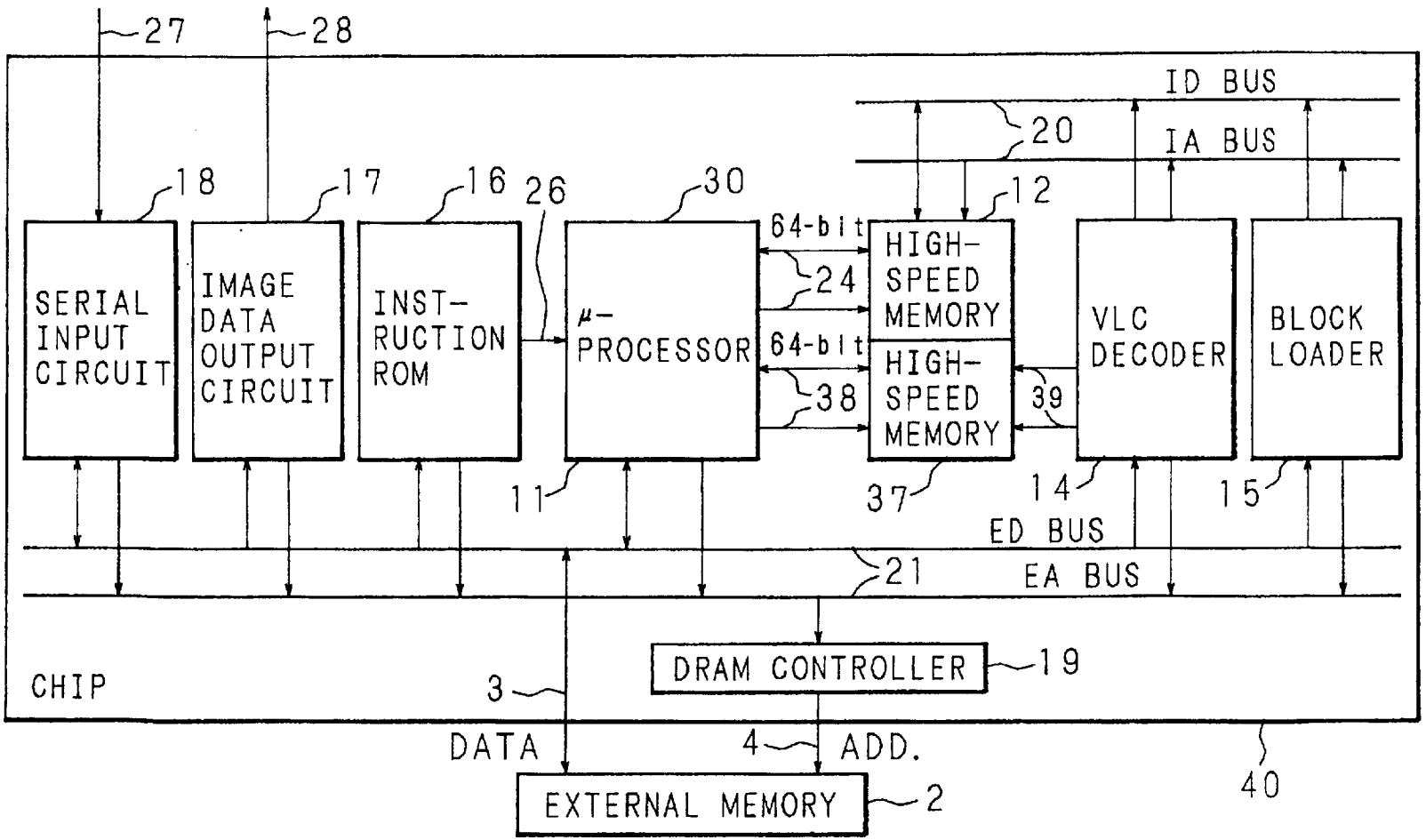
FIG. 22 is a block diagram showing an example of the configuration of a system including a ninth embodiment of an image processing device of the invention connected to a memory.

FIG. 22 is a block diagram showing an example of the construction of a ninth embodiment of the image processing device of the invention in a system, to which is connected a memory. In the figure, numeral 40 denotes a chip on which is mounted the image processing device of the invention, which is connected to the external memory 2 composed of a plurality of DRAM chips via the data bus 3, the address bus 4 and the like, similar to the embodiments mentioned earlier.

The image processing device of Embodiment 9 is provided with a high-speed memory 37 specialized for the VLC decoder 14 in addition to the high-speed memory 12 provided in the image processing device of Embodiment 6 shown in FIG. 19. The VLC decoder 14 is connected to the high-speed memory 37 via a bus 39. The high-speed memory 37 is connected to the microprocessor 30 via a bus 38. Therefore, the VLC decoder 14 and the block loader 15 can respectively transfer data to the microprocessor 30 via the high-speed memories 37 and 12. In the device, the VLC decoder 14 decodes the variable length codes fetched from the external memory 2 into fixed length code data of 8 bits per pixel and writes the decoded data into the high-speed memory 37 through the bus 39. Meanwhile, the microprocessor 30 reads out the fixed length code data from the high-speed memory 37 through the bus 38. The block loader 15 reads out the predictive data from the external memory 2, then writes the read-out data into the high-speed memory 12 through the internal bus 20. The microprocessor 30 reads out the predictive data from the memory 12 through the bus 24.

(2) Processing example of the MPEG standard moving picture data

The image processing device of Embodiment 9 processes the MPEG standard moving picture data in almost the same way as in the above-mentioned Embodiment 6. Differences are that the VLC decoder 14 and the block loader 15 write the results of the processes corresponding to those in the steps S13 and S17 of FIG. 13 in the independent high-speed memories 37 and 12, respectively, and the microprocessor 30 reads the result data from the high-speed memories 37 and 12 in the processes corresponding to those in the steps S14 and S18 of FIG. 13.

(3) Effects

In the device of Embodiment 9, the VLC decoder 14 and the block loader 15 transfers data to the microprocessor 30 through the independent high-speed memories 37 and 12, respectively, so that the VLC decoder 14 and the block loader 15 can write data into the high-speed memories 37 and 12 without controlling of the access right to the internal bus 20 taken into consideration although it is necessary in the image processing device of Embodiment 6. Accordingly, controlling of writing to the high-speed memories 12, 37 is facilitated.

[Other Embodiments]

Though the VLC decoder 14 or the block loader 15 transfers data to the microprocessor 10, 11 or to the microprocessor 30 through the high-speed memory 12 or 13 in the abovementioned Embodiments 1–9, moving picture data is similarly processable without the high-speed memories 12, 13 if the microprocessor has a function of prefetching data to registers.

Further, though the block loader 15 extends an 8 bit pixel value to a 16 bit pixel value with zeros when processing the predictive data by the full pel in all of the abovementioned Embodiments 1–9 except Embodiment 3, the block loader 15 may write the 8-bit pixel value read out from the external memory 2 as it is without an extension to the high-speed memory 12 or 13 in case of processing the predictive data by the full pel.

Besides, though the block loader 15 adds adjacent pixel values in the same row when loading block data in all of the above-mentioned Embodiments 1–9 except Embodiment 3, the block loader 15 may be adapted to add pixel values of adjacent rows or add neighboring four pixel values by setting a register holding entire pixel data of one row thereby to provide a function to add pixel values of adjacent rows when loading the block data.

Further, though the microprocessors 10, 11 or the microprocessor 30 fetches and executes an instruction from the instruction ROMs 31, 32 or the external memory 2 in all of the above-mentioned Embodiments 5–7, 9, the microprocessors 10, 11 or the microprocessor 30 is not required to fetch an instruction from the external memory 2 if the instruction ROMs 31, 32 can store the entire program necessary for the image processing.

Moreover, though variable length code data is input through the serial signal line 27 and the processed data is output to the external display unit through the bus 28 in all of the above-mentioned Embodiments 1–6, the serial input circuit 18 and the image data output circuit 17 may be omitted if the variable length coded data preliminarily stored in the external memory 2 is processed and written back to the external memory 2.

Further, the DRAM controller 19 in all of Embodiments is unnecessary if the external memory 2 includes a DRAM controller or if the external memory 2 is composed of a memory other than DRAM.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image processing device comprising:

a processor which includes an instruction decoder for decoding instructions of an image processing program and an instruction executing unit for executing the instructions responsive to outputs from said instruction decoder, and outputs the execution result by said instruction executing unit; and a data loader, connected to said processor, which includes a data reading unit for reading image data of fixed length codes, an adding unit, connected to the data reading unit, for adding image data of at least two adjacent pixels of the image data read by the data reading unit, and a data writing unit, connected to the adding unit, for writing the addition result by the adding unit into said processor, wherein said processor is configured to perform a process of decoding a first kind of image data of variable length codes to a second kind of image data of fixed length codes, a process of transforming the second kind of image data to a third kind of image data, a process of performing a prescribed operation between the third kind of image data and the addition result written by said data loader.

2. An image processing device comprising:

a memory for storing data used for executing an image processmg program;

a processor, connected to said memory, which includes an instruction decoder for decoding instructions of the image processing program and an instruction executing unit for executing the instructions responsive to outputs from said instruction decoder, and performs a prescribed operation according to the instructions described in the image processing program and outputs the operation result; and a data loader, connected to said memory, which includes a data reading unit for reading image data of fixed length codes, an adding unit, connected to the data reading unit, for adding image data of at least two adjacent pixels read by the data reading unit, and a data writing unit, connected to the adding unit, for writing the addition result by the adding unit into said memory, wherein said processor is configured to perform a process of decoding a first kind of image data of variable length codes to a second kind of image data of fixed length codes, a process of transforming the second kind of image data to a third kind of image data, a process of performing a prescribed operation between the third kind of image data and the addition result written by said data loader into said memory.

3. An image processing device comprising:

a memory for storing data used for executing an image processmg program;

a processor, connected to said memory, which includes an instruction decoder for decoding instructions of the image processing program and an instruction executing unit for executing the instructions responsive to outputs from said instruction decoder, and performs a prescribed operation according to the instructions described in the image processing program and outputs the operation result; and a data loader, connected to said memory, which includes a data reading unit for reading image data of fixed length codes for the half pel or for the full pel, an adding unit, connected to the data reading unit, for adding image data of at least two adjacent pixels of the image data of fixed length codes read by the data reading unit in case of processing of image data for the half pel, while extending a bit width of the image data of fixed length codes read by the reading unit in case of processing of image data for the full pel, and a data writing unit, connected to the adding unit, for writing to said memory first data of the addition result by the adding unit or second data extended in the bit width by the adding unit, wherein said processor is configured to perform a process of decoding a first kind of image data of variable length codes to a second kind of image data of fixed length codes, a process of transforming the second kind of image data to a third kind of image data, a process of performing a prescribed operation between the third kind of image data and the first or second data by reading the first data from said memory in case of processing of the image data for the half pel or the second data from said memory in case of processing of the image data for the full pel.

4. An image processing device comprising:

a first memory and a second memory for storing data used for executing an image processing program;

a first processor, connected to the first memory, which includes a first instruction decoder for decoding instructions of the image processing program, and a first instruction executing unit for executing the instructions responsive to outputs from the first instruction decoder, and outputs the execution result by the first instruction executing unit;

a second processor, connected to the second memory, which includes a second instruction decoder for decoding the instructions of the image processing program and a second instruction executing unit for executing the instructions responsive to outputs from the second instruction decoder, and outputs the execution result by the second instruction executing unit;

a variable length code decoder, connected to the first and second memories, which decodes a first kind of image data of variable length codes to a second kind of image data of fixed length codes and outputs the decoding result to the first or second memory; and a data loader, connected to the first and second memories, which outputs image data of fixed length codes to the first or second memory, wherein said first and second processors respectively are configured to perform a process of reading the second kind of image data from the first or second memory and transforming the second kind of image data to a third kind of image data, and a process of reading image data of fixed length codes from said first or second memory and performing a prescribed operation between the third kind of image data and the image data of the fixed length codes.

5. An image processing device as set forth in claim 4, further comprising a third memory, connected to the first and second processors, for storing instructions of the image processing program, wherein the first and second processors further include, respectively, means for operating in parallel with each other by reading out the instructions from the third memory.

6. An image processing device comprising:

a processor which includes an instruction decoder for decoding instructions of the image processing program and an instruction executing unit for executing the instructions responsive to outputs from said instruction decoder, and outputs the execution result by said instruction executing unit;

a variable length code decoder, connected to said processor, which decodes a first kind of image data of variable length codes to a second kind of image data of fixed length codes and outputs the second kind of image data to said processor; and a data loader, connected to said processor, which includes a data reading unit for reading image data of fixed length codes, an adding unit, connected to the data reading unit, for adding image data of at least two adjacent pixels of the image data of fixed length codes, and a data writing unit, connected to the adding unit, for writing the addition result by the adding unit into said processor, wherein said processor is configured to perform a process of transforming the second kind of image data output from said variable length code decoder to a third kind of image data, and a process of performing a prescribed operation between the third kind of image data and the addition result written by said data loader.

7. An image processing device comprising:

a memory for storing data used for executing an image processmg program;

a processor, connected to said memory, which includes an instruction decoder for decoding instructions of the image processing program and an instruction executing unit for executing the instructions responsive to outputs from said instruction decoder, and outputs and execution result by said instruction executing unit;

a variable length code decoder, connected to said memory, which decodes a first kind of image data of variable length codes to a second kind of image data of fixed length codes and outputs the second kind of image data to said memory; and a data loader, connected to said memory, which includes a data reading unit for reading image data of fixed length codes, an adding unit, connected to the data reading unit, for adding image data of at least two adjacent pixels of the image data of fixed length codes read by the data reading unit, and a data writing unit connected to the adding unit, for writing the addition result by the adding unit into said memory, wherein said processor is configured to perform a process of reading the second kind of image data from said memory and transforming the second kind of image data to a third kind of image data, and a process of performing a prescribed operation between the third kind of image data and the addition result read from said memory.

8. An image processing device comprising:

a first and second memories for storing data used for executing an image processing program;

a processor, connected to the first memory, which includes an instruction decoder for decoding instructions of the image processing program and a first instruction executing unit for executing the instructions responsive to outputs from the first instruction decoder, and outputs the execution result by the first instruction executing unit;

a second processor, connected to the second memory, which includes a second instruction decoder for decoding the instructions of the image processing program and a second instruction executing unit for executing the instructions responsive to outputs from the second instruction decoder, and outputs the execution result by the second instruction executing unit;

a variable length code decoder, connected to the first and second memories, which decodes a first kind of image data of variable length codes to a second kind of image data of fixed length codes and outputs the decoding result to the first and second memory;

a data loader, connected to the first and second memories, which includes a data reading unit for reading image data of fixed length codes, an adding unit, connected to the data reading unit, for adding image data of at least two adjacent pixels of the image data of fixed length codes read by the data reading unit, and a data writing unit connected to the adding unit, for writing the addition result by the adding unit to the first and second memory, wherein said first and second processors respectively is configured to perform a process of reading the second kind of image data from the first or second memory and transforming the second kind of image data to a third kind of image data, and a process of reading the addition result from said first or second memory and performing a prescribed operation between the third kind of image data and the addition result.

9. An image processing device as set forth in claim 8, further comprising a third memory, connected to the first and second processors, for storing instructions of the image processing program, wherein the first and second processors further include, respectively, means for operating in parallel with each other by reading out the instructions from the third memory.

10. An image processing device comprising:

a memory for storing data used for executing an image processmg program;

a read-only memory for storing the image processing program;

a processor, connected to said memory and said read only memory, which includes an instruction decoder for decoding instructions of the image processing program and an instruction executing unit for executing the instructions responsive to outputs from said instruction decoder, and outputs the execution result by said instruction executing unit;

a variable length code decoder, connected to said memory, which decodes a first kind of image data of variable length codes to a second kind of image data of fixed length codes and outputs the second kind of image data to said memory; and a data loader, connected to said memory, which includes an adding unit that adds image data of at least two adj acent pixels read by the data loader and outputs image data of fixed length codes to said memory, wherein said processor is configured to perform a process of reading the second kind of image data from said memory and transforming the second kind of image data to a third kind of image data, and a process of reading image data of fixed length codes from said memory and performing a prescribed operation between the third kind of image data and the image data of fixed length codes.

11. An image processing device comprising:

first and second memories for storing data used for executing an image processing program;

a processor, connected to the first and second memories, which includes an instruction decoder for decoding instructions of the image processing program and an instruction executing unit for executing the instructions responsive to outputs from said instruction decoder, and outputs the execution result by said instruction executing unit;

a variable length code decoder, connected to the first memory, which decodes a first kind of image data of variable length codes to a second kind of image data of fixed length codes and outputs the second kind of image data to the first memory; and a data loader, connected to the second memory, which includes an adding unit that adds image data of at least two adjacent pixels read by the data loader and outputs image data of fixed length codes to the second memory, wherein said processor is configured to perform a process of reading the second kind of image data from the first memory and transforming a second kind of image data to a third kind of image data, and a process of reading image data of fixed length codes from the second memory and performing a prescribed operation between the third kind of image data and the image data of fixed length codes.

12. An image processing device comprising:

a processor which includes an instruction decoder for decoding instructions of an image processing program and an instruction executing unit [for] *for* executing the instructions responsive to outputs [for] *from* said instruction decoder, and outputs the execution result by said instruction executing unit; and a variable length code decoder, connected to said processor, which decodes a first kind of image data of variable length codes to a second kind of image data of fixed length codes, and outputs the second kind of data to said processor, wherein said processor is configured to perform a process of transforming the second kind of image data output from said variable length code decoder to a third kind of image data according to the image processing program, and wherein the processor includes a register having a first portion and a second portion for storing two image data each comprising a number (n) of bits, and the instruction executing unit of the processor is able to independently access said first portion and said second portion of said register.

13. An image processing device comprising:

a processor which includes an instruction decoder for decoding instructions of an image processing program and an instruction executing unit for executing the instructions responsive to outputs from said instruction decoder, and outputs the execution result by said instruction executing unit; and a data loader, connected to said processor, which outputs image data for fixed length codes to said processor, wherein said processor is configured to perform a process of decoding a first kind of image data of variable length codes to a second kind of image data of fixed length codes, a process of transforming the second kind of image data to a third kind of image data, and a process of a prescribed operation between the third kind of image data and the image data of fixed length codes output from said data loader, and wherein the processor includes a register having a first portion and a second portion for storing two image data each comprising a number (n) of bits, and the instruction executing unit of the processor is able to independently access said first portion and said second portion of said register.

14. An image processing device comprising:

a processor which includes an instruction decoder for decoding instructions of an image processing program and an instruction executing unit [for] *for* executing the instructions responsive to outputs [for] *from* said instruction decoder, and outputs the execution result by said instruction executing unit; and a variable length code decoder, connected to said processor, which decodes a first kind of image data of variable length codes to a second kind of image data of fixed length codes, and outputs the second kind of data to said processor, wherein said processor is configured to perform a process of transforming the second kind of image data output from said variable length code decoder to a third kind of image data according to the image processing program, and wherein each of the instructions decoded by the instruction decoder of the processor includes a first operation specifying field and a second operation specifying field each for specifying an operation, and the instruction executing unit of the processor has a first operation unit and a second operation unit for performing said operations specified by said first and second operation specifying fields in parallel.

15. An image processing device comprising:

a processor which includes an instruction decoder for decoding instructions of an image processing program and an instruction executing unit for executing the instructions responsive to outputs from said instruction decoder, and outputs the execution result by said instruction executing unit; and a data loader, connected to said processor, which outputs image data for fixed length codes to said processor, wherein said processor is configured to perform a process of decoding a first kind of image data of variable length codes to a second kind of image data of fixed length codes, a process of transforming the second kind of image data to a third kind of image data, and a process of a prescribed operation between the third kind of image data and the image data of fixed length codes output from said data loader, and wherein each of the instructions decoded by the instruction decoder of the processor includes a first operation specifying field and a second operation specifying field each for specifying an operation, and the instruction executing unit of the processor has a first operation unit and a second operation unit for performing said operations specified by said first and second operation specifying fields in parallel.

*16. An image processing device comprising:*

*a processor, connected to a memory, which includes an instruction decoder for decoding instructions of an image processing program and an instruction executing unit for executing the instructions responsive to outputs from said instruction decoder, and outputs the execution result by said instruction executing unit; and*

*a variable length code decoder, connected to the memory, which decodes a first kind of image data of variable length codes to a second kind of image data of fixed length codes, and provides the second kind of image data to the memory,*

*wherein said processor is configured to perform a process of reading the second kind of image data from the memory and transforming the second kind of image data a to a third kind of image data according to the image processing program, and*

*wherein the instructions decoded by the instruction decoder of the processor includes at least an instruction having a first operation specifying field and a second operation specifying field each for specifying an operation, and the instruction executing unit of the processor has a first operation unit and a second operation unit for performing said operations specified by said first and second operation specifying fields in parallel.*

*17. The image processor device as set forth in claim 14, further comprising*

*a data loader loading data from a memory and outputting image data of fixed length codes;*

*wherein said processor is configured to further perform a process of operating between the third kind of image data and the image data of fixed length codes output from the data loader.*

*18. The image processor device as set forth in claim 16, further comprising:*

*a data loader loading data from another memory and outputting image data of fixed length codes; wherein said processor is configured to further perform a process of operating between the third kind of image data and the image data of fixed length codes output from the data loader.*

*19. An image processing device comprising:*

*a processor, connected to a memory, which includes an instruction decoder for decoding instructions of an image processing program and an instruction executing unit for executing the instructions responsive to outputs from said instruction decoder, and outputs the execution result by said instruction executing unit; and*

*a data loader, connected to the memory, which outputs image data for fixed length data to the memory,*

*wherein said processor is configured to perform a process of decoding a first kind of image data of variable length codes to a second kind of image data, of fixed length*[s] *codes, a process of transforming the* second kind of image data to a third kind of image data and a process of a prescribed operation between the third kind of image data and the image data of fixed length codes output from the memory, and

*wherein each of the instructions decoded by the instruction decoder of the processor includes a first operation specifying field and a second operation specifying field each for specifying an operation, and the instruction executing unit of the processor has a first operation unit and a second operation unit for the processor for performing said operations specified by said first and second operation specifying fields in parallel.*

*20. An image processing device comprising:*

*a processor which includes an instruction decoder for decoding instructions of an image processing program and an instruction executing unit for executing the instructions responsive to outputs from said instruction decoder; and*

*a variable length code decoder, which decodes a first kind of image data of variable length codes to a second kind of image data of fixed length codes, and outputs the second kind of data,*

*wherein said processor is configured to perform a process of transforming the second kind of image data output from said variable length code decoder to a third kind of image data according to the image processing program, and*

*wherein the processor further includes a plurality of registers storing image data, each register having a plurality of portions, said instruction executing unit executes a prescribed instruction decoded by said instruction decoder, the prescribed instruction having a first field specifying contents of an operation, a second field specifying a register number of each of said plurality of registers, and a third field specifying each of the plurality of portions, said instruction executing unit performing the operation specified by the first field using a portion specified by the third field in a register specified by the second field.*

*21. The image processing device as set forth in claim 20, wherein*

*said variable length code decoder outputs the second kind of image data to a memory, and said processor receives the second kind of image data from the memory.*

*22. An image processing device comprising:*

*a processor which includes an instruction decoder for decoding instructions of an image processing program and an instruction executing unit for executing the instructions responsive to outputs from said instruction decoder; and*

*a data loader, which outputs image data for fixed length codes,*

*wherein said processor is configured to perform a process of decoding a first kind of image data variable length codes to a second kind of image data of fixed length codes, a process of transforming the second kind of image data to a third kind of image data, and a process of prescribed operation between the third kind of image data and the image data of fixed length codes output from said data loader, and*

*wherein the processor further includes a plurality of registers storing image data, each register having a plurality of portions, said instruction executing unit executes a prescribed instruction decoded by said instruction decoder, the prescribed instruction having a first field specifying contents of an operation, a second field specifying a register number of each of said plurality of registers and a third field specifying each of the plurality of portions, said instruction executing unit performing the operation specified by the first field using a portion specified by the third field in a register specified by the second field.*

*23. The image processing device as set forth in claim 22, wherein*

*said data loader outputs the image data of fixed length codes to a memory, and said processor receives the image data of fixed length codes from the memory.*

* * * * *